United States Patent
Narasimharao et al.

(10) Patent No.: US 11,185,855 B1
(45) Date of Patent: Nov. 30, 2021

(54) CU, FE AND MN OXIDE INTERCALATED $SiO_2$ PILLARED MAGADIITE AND ILERITE CATALYSTS FOR NITROGEN MONOXIDE (NO) DECOMPOSITION

(71) Applicant: KING ABDULAZIZ UNIVERSITY, Jeddah (SA)

(72) Inventors: Katabathini Narasimharao, Jeddah (SA); Mohamed Mokhtar, Jeddah (SA); Islam Hamdy Abd El Maksod, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 17/220,350

(22) Filed: Apr. 1, 2021

(51) Int. Cl.
| | | |
|---|---|---|
| *C01B 33/20* | (2006.01) | |
| *B01J 35/10* | (2006.01) | |
| *F01N 3/28* | (2006.01) | |
| *C01B 21/02* | (2006.01) | |
| *C01B 13/02* | (2006.01) | |
| *B01J 23/74* | (2006.01) | |

(52) U.S. Cl.
CPC ....... *B01J 35/1019* (2013.01); *C01B 13/0203* (2013.01); *C01B 21/02* (2013.01); *C01B 33/20* (2013.01); *F01N 3/2803* (2013.01); *B01J 23/74* (2013.01); *B01J 2523/17* (2013.01)

(58) Field of Classification Search
None
See application file for complete search history.

(56) References Cited

U.S. PATENT DOCUMENTS

| | | | | |
|---|---|---|---|---|
| 5,183,559 | A * | 2/1993 | Kirker | B01J 29/049 |
| | | | | 208/118 |
| 2014/0119381 | A1 * | 5/2014 | Diab | H04L 41/085 |
| | | | | 370/431 |

OTHER PUBLICATIONS

Mokhtar, Adel, et al. "Structure and intercalation behavior of copper II on the layered sodium silicate magadiite material". Chem. Pap. Springer. Jul. 2017. (Year: 2017).*
Moura, Hipassia, et al. "Functionalized mesoporous solids based on magadiite and [Al]-magadiite". Dalton Trans. 43, 10471. 2014. (Year: 2014).*
Dailey, James et al. "Silica-Pillared Derivatives of H+-Magadiite, a crystalline hydrated Silica". Chem. Mater. 4, 855-863. 1992. (Year: 1992).*

* cited by examiner

*Primary Examiner* — Sheng H Davis
(74) *Attorney, Agent, or Firm* — W&C IP

(57) ABSTRACT

Catalysts for the direct decomposition of NO are provided. The catalysts comprise $SiO_2$ pillared magadiite or ilerite comprising intercalated Cu, Fe or Mn oxide. Methods and systems for using the catalysts to directly decompose NO are also provided.

12 Claims, 10 Drawing Sheets

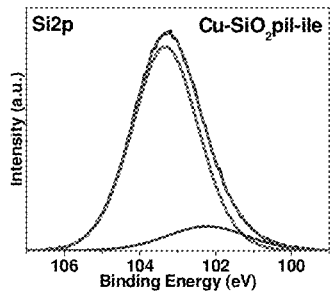
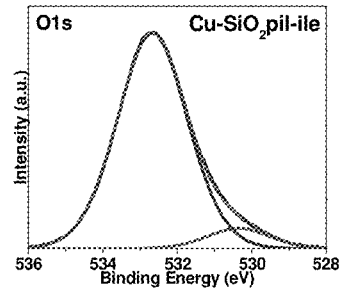
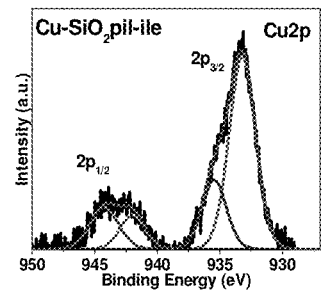
Figure 4A　　　　　　Figure 4B　　　　　　Figure 4C
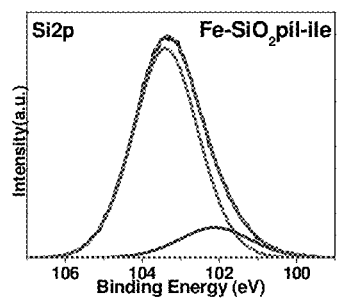
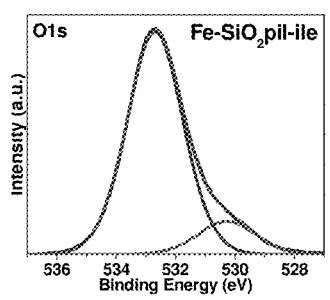
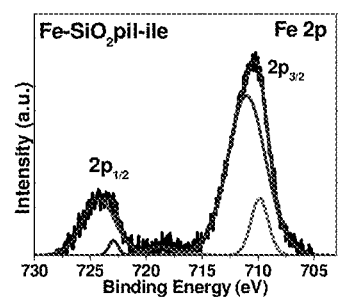
Figure 4D　　　　　　Figure 4E　　　　　　Figure 4F
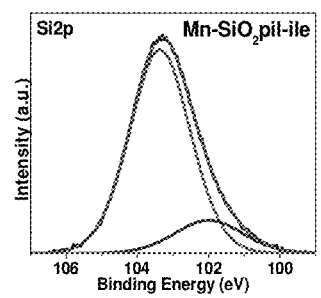
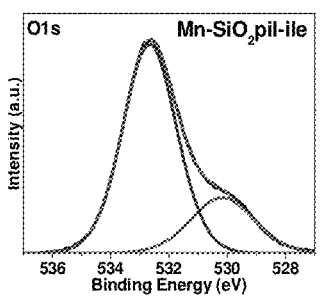
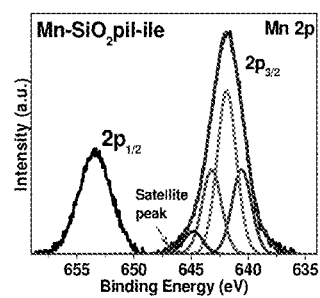
Figure 4G　　　　　　Figure 4H　　　　　　Figure 4I

CU, FE AND MN OXIDE INTERCALATED SIO₂ PILLARED MAGADIITE AND ILERITE CATALYSTS FOR NITROGEN MONOXIDE (NO) DECOMPOSITION

BACKGROUND OF THE INVENTION

Field of the Invention

The invention generally relates to improved catalysts for the direct decomposition of NO. In particular, the invention provides $SiO_2$ pillared magadiite and ilerite catalysts comprising intercalated Cu, Fe and Mn oxides and methods of their use to directly decompose NO.

Description of Related Art

Nitrogen monoxide (NO) is one of greenhouse gas responsible for ozone depletion and global warming [1]. The focus to control NO emissions from the mobile and stationary sources was increased due to the fact that the global warming potential of NO is higher than $CO_2$ [2]. The direct NO decomposition is the best suitable approach for NO removal due to the fact that the process is very simple [3]. The direct NO decomposition is thermodynamically favorable at temperatures below 1700° C., however rate of reaction is low. The catalytic decomposition of NO is well studied due to the fact that it is recognized as the suitable process for NO elimination from exhaust streams [4]. The two major issues those need to be addressed for development of NO decomposition catalyst are catalyst activity and durability [5]. The design and development of an effective heterogeneous catalyst for direct NO decomposition would eliminate the utilization of different types of reducing agents. This process could greatly help to simplify the process of elimination of NO and/or decrease the cost of NO control in different industrial sectors [6].

A variety of catalysts have been utilized for the decomposition of NO gas, including noble metals [7], metal oxides [8] and ion exchanged zeolites [9]. Noble metals such as Rh and Pd were proved as an active species in three-way catalytic converters; these catalytic systems exhibited superior performance for the NO decomposition [1]. However, the catalysts containing noble metals are expensive and unstable at high temperature as well as the catalysts which contained noble metals deactivate quickly in the presence of oxygen [10]. Transition metal oxides (e.g. Co, Cu, Fe and Mn oxides) based catalysts were also exhibited better catalytic activities for NO decomposition due to their superior redox behavior [11]. Utilization of the transition metal oxides is highly explored due to their high abundance in nature and inexpensive. It was also observed that the transition metal ion exchanged mesoporous zeolites, primarily Cu-exchanged ZSM-5 materials were good catalysts for NO decomposition [12]. However, several tests with the transition metals contained zeolite catalysts have demonstrated that zeolites inefficiently catalyze NO decomposition [13]; the catalysts were oxidized when the reaction progresses and finally the NO decomposition was inhibited. Moreover, the zeolite materials are suffering from a major limitation that they are not hydrothermally stable [14].

Interestingly, in the layered silicates, the distance between silica layers can be adjusted by swelling and pillaring, thereby enabling the large molecules to diffuse to reach active centers located in or between the layers; this unique property provides layered silicates a significant advantage over the microporous zeolites [15]. The synthesis of pillared layered silicates has expanded considerably due to the scope of their utilization as heterogeneous catalysts for different chemical reactions [16]. It was observed that layered materials pillared with inorganic oxides possessed meso/macro pore structure, high thermal stability and high surface area as similar as meso porous zeolites [17]. Synthetic layered silicates such as magadiite ($Na_2Si_{14}O_{29}.xH_2O$) and ilerite ($Na_2Si_8O_{17}.xH_2O$) are considered to be useful hosts for preparing pillared materials [18]. These materials possessed similar characteristics as natural clay materials and the interlayer spaces could expanded simply by intercalation of guest molecules. Several years ago, Landis et al [19] synthesized high surface area contained $SiO_2$-pillared magadiite (around 530 $m^2\ g^{-1}$) by reacting the tetraethyl orthosilicate with octylamine. Later, Kosuge and Tsunashima [20] reported the preparation of very high surface area (1000 $m^2\ g^{-1}$) containing silica-pillared ilerite by intercalation of octylamine and tetraethyl orthosilicate into the layered ilerite.

Schwieger et al synthesized Pt ion exchanged ilerite silicate using $Pt(NH_3)_4^{2+}$ as Pt precursor and observed that Pt loaded ilerite materials exhibited bifunctional character [21, 22]. Schwieger et al also synthesized Pt loaded magadiite materials and observed that the structure of the silica layers was not affected even after 22.2 wt % Pt loading [23]. Kim et al prepared and characterized metal (Ti, Fe, Zr) oxide pillared layered ilerite samples. Introduction of transition metals such as Cu, Fe and Mn could generate redox active sites, et al [26] synthesized Cu, Zn—pillared ilerite materials and used as catalysts for direct synthesis of dimethyl ether from synthesis gas. Ozawa et al [27] synthesized well dispersed Ag and ZnO magadiite nanocomposites with size between 3-5 nm. However, synthesis and application of manganese oxide-pillared layered silicates was not reported well in the literature [28].

Ding et al [29] reviewed the catalytic activities of different pillared silicates for the selective reduction of NO with $NH_3$. It was reported that the pillared layered silicate catalysts were stable in presence of $SO_2$ and $H_2O$ and exhibited higher activity compared to conventional vanadium-titanium oxide catalysts. In this context, transition metals intercalated pillared-layered silicates supposedly effective catalysts in direct NO decomposition due to presence of redox sites [30]. In the present work, magadiite and ilerite were first pillared with $SiO_2$ and then intercalated with Cu, Fe and Mn oxides. The synthesized materials were utilized for direct NO decomposition and also analyzed by different characterization techniques to study their physico-chemical properties. The role of structural and electronic properties of the materials with NO decomposition activity was established.

There is an ongoing need to provide improved alternative catalysts for NO decomposition.

SUMMARY OF THE INVENTION

Other features and advantages of the present invention will be set forth in the description of invention that follows, and in part will be apparent from the description or may be learned by practice of the invention. The invention will be realized and attained by the compositions and methods particularly pointed out in the written description and claims hereof.

It is an object of this invention to provide a catalyst for direct decomposition of NO to $N_2$ and $O_2$, comprising $SiO_2$ pillared magadiite comprising Cu oxide, Fe oxide or Mn oxide intercalated therein; or $SiO_2$ pillared ilerite comprising Cu oxide, Fe oxide or Mn oxide intercalated therein. In some aspects, a bulk catalyst comprising $SiO_2$ pillared magadiite comprises 50-60 wt % Si, 30-35 wt % O, and/or 12-13 wt % metals; and a bulk catalyst comprising $SiO_2$ pillared ilerite comprises 45-50 wt % Si, 40-42 wt % O and/or 12-13 wt % metals. In further aspects, a catalytic surface of the catalyst comprising $SiO_2$ pillared magadiite comprises 34-36 wt % Si, 53-55 wt % O and 10-12 wt % metals; and a catalytic surface of the catalyst comprising $SiO_2$ pillared ilerite comprises 42-45 wt % Si, 45-47 wt % O and 10-12 wt % metals. In additional aspects, the catalyst comprising $SiO_2$ pillared magadiite has a catalytic surface area from 300 to 400 $m^2/g^{-1}$; and the catalyst comprising $SiO_2$ pillared ilerite has a catalytic surface area from 350 to 500 $m^2/g^{-1}$. In yet further aspects, the catalyst comprising $SiO_2$ pillared magadiite has a pore volume from 0.275 to 0.390 (cc g-1) and a pore width from 2.0 to 3.0 nm; and the catalyst comprising $SiO_2$ pillared ilerite has a pore volume from 0.275 to 0.390 (cc g-1) and a pore width from 2.0 to 3.5 nm. In additional aspects, for $Cu$—$SiO_2$-pil-mag, the turnover frequency (TOF) is 16-17 at 400° C., 21-23 at 450° C., 28-29° C. at 500° C., 30-33 at 550° C. and 33 to 35 at 600° C.; for $Cu$—$SiO_2$-pil-ile, the TOF is 20-22 at 400° C., 29-30.5 at 450° C., 38-41 at 500° C., 48-50 at 550° C. and 50-55 at 600° C.; for $Fe$—$SiO_2$-pil-mag, the TOF is 7-8 at 400° C., 10-11 at 450° C., 14.5-15.5° C. at 500° C., 16.5-18 at 550° C. and 17-20 at 600° C.; for $Fe$—$SiO_2$-pil-ile, the TOF is 9-10 at 400° C., 12.5-14 at 450° C., 16.5-18° C. at 500° C., 19-21 at 550° C. and 20-22 at 600° C.; for $Mn$—$SiO_2$-pil-mag, the TOF is 6-7 at 400° C., 7.5-8.5 at 450° C., 10-11.5° C. at 500° C., 11-13 at 550° C. and 13-15 at 600° C.; and for Mn-SiO2-pil-ile, the TOF is 7-8.5 at 400° C., 10.5-11.5 at 450° C., 12.5-14° C. at 500° C., 14-16 at 550° C. and 16.5 to 18 at 600° C.

Also provided is a method of direct decomposition of NO to $N_2$ and $O_2$, comprising contacting the NO with a catalyst of claim 1, wherein the step of contacting results in direct decomposition of NO to $N_2$ and $O_2$. In some aspects, the step of contacting is performed in the temperature range of 400-600° C. In certain aspects, the catalyst is $SiO_2$ pillared magadiite comprising Cu oxide intercalated therein or $SiO_2$ pillared ilerite comprising Cu oxide intercalated therein. In other aspects, the activation energy for the direct decomposition of NO is at most 20 kcal $mol^{-1}$ at 500° C. In additional aspects, the reaction rate for the direct decomposition of NO is at least 2.5 µmol $N_2$ $s^{-1}$ $g^{-1}$ at 500° C. In yet further aspects, the step of contacting results in 90% NO direct decomposition of NO at 600° C. In other aspects, the method is at least 80% selective for the direct decomposition of NO at 600° C.

Also provided is a system for directly decomposing NO, comprising a catalyst housing comprising at least one catalyst of claim 1. In some aspects, the system is an emissions treatment device.

DETAILED DESCRIPTION

Figure 1A:
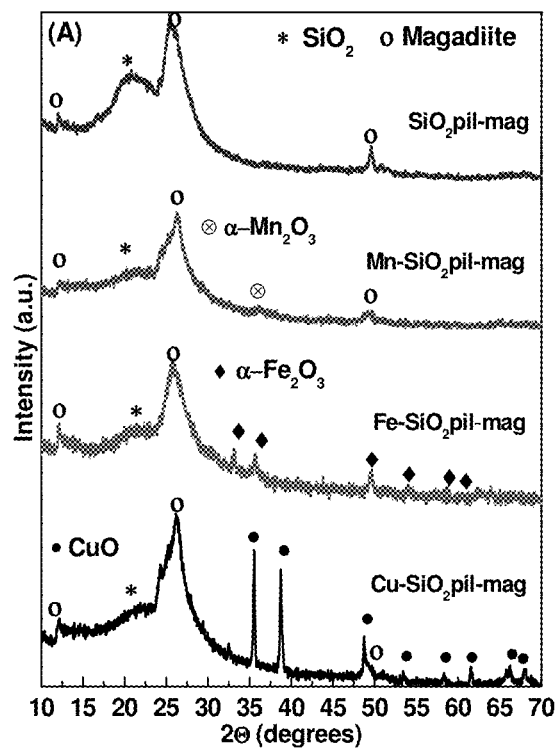
FIGS. 1A and B. Powder XRD patterns of Cu, Fe and Mn oxides intercalated $SiO_2$-pillared (A) magadiite (B) ilerite samples.

The present disclosure provides catalysts that are selective and efficient for direct decomposition of NO (referred to as nitrogen monoxide, nitric oxide, nitrogen oxide, etc.). The catalysts comprise $SiO_2$ pillared magadiite or ilerite with Cu oxide, Fe oxide or Mn oxide intercalated therein.

Making the Catalysts

For synthetic purposes, magadiite is generally formed synthetically, for example, as described in issued U.S. Pat. Nos. 4,626,421 and 4,689,207, the complete contents of each of which is hereby incorporated by reference in entirety; using poly(ethylene glycol) as a template (see Feng & Balkus Jr., Journal of Porous Materials volume 10, pages 5-15 (2003); as described in Logaly and Beneke (American Mineralogist 60, 642-649, 1975); or as described by Schwieger, et al., J. Phys. Chem. Solids, 65 (2004) 413-420 reference [23] herein; etc. However, natural magadiite may also be obtained e.g. from lake beds at Lake Magadi, Kenya or from Olduvai Gorge, Tanzania.

In some aspects, the magadiite is made synthetically e.g. by the method described in the Examples below, namely the method according to Schwieger, et al. [23]. Briefly, a weakly alkaline (e.g. pH in the range of from about 12 to about 13) and $SiO_2$-rich ternary system with $SiO_2$:$Na_2O$:$H_2O$ at a molar ratio of 5:1:75 was prepared $Na_2CO_3$ was added in small portions e.g. (drop wise) until a dense gel was formed. The gel was crystallized at 140° C. for 48 h using a hydrothermal method (e.g. in an autoclave) without prior aging. Solid magadiite crystals were filtered, washed (e.g. with distilled water and then dried at a temperature in the range of from about 90 to 130° C., such as about 100 to about 120° C., such as about 110° C.; for period of time ranging from about 6 hrs to about 24 hrs, such as about 12 h.

Ilerite can be made e.g. by hydrothermal syntheses as described by Supronowicz and Roessner (Clays and Clay Minerals (2011) 59 (1): 95-105); or as described by Brenn, et al. (Microporous Mesoporous Mater. 40 (2000) 43-52).

In some aspects, ilerite is synthesized by the method described in the Examples section below, which is similar to that of Karger at al [31]. Briefly, colloidal silica (Ludox® AS-40), sodium hydroxide pellets and deionized water in a ratio of $Na_2O$:$8SiO_2$:$9H_2O$ were weighed and mixed in a beaker under constant stirring (pH in the range of 13-14). Mixing of these starting materials resulted the formation of a gel. The synthesis gel was then crystallized using a hydrothermal method (e.g. an autoclave) without prior aging. The temperature for crystallization is generally in the range of about 90 to about 110° C., such as about 100° C., and is performed for a period of time ranging from e.g. about 14 to about 28 days, such as about 21 days, while maintaining static conditions. The ilerite crystals are then filtered, washed and dried prior to the synthetic steps described next.

The following steps apply to both magadiite and ilerite crystals ("layered silicates" or "clays") for swelling and $SiO_2$ pillaring.

An aqueous slurry of a magadiite or ilerite clay, a quaternary ammonium surfactant CTAB ($C_{19}H_{42}BrN$) and tetrapropyl ammonium hydroxide (TPAOH) was formed to swell the clay. For example, 9.0 g of aqueous clay slurry (20 wt. % solid) was added to 35.0 g of an aqueous solution of 29 wt. % of CTAB and 11.0 g of an aqueous solution of 40 wt. % TPAOH. Swelling was allowed to proceed at a temperature in the range of from about 30 to 50° C., such as about 40° C., under high pH conditions (e.g. a pH of at least about 12, 13 and preferably a pH~14). The mixture was stirred at about 40° C. for a period of time ranging from about 12 to about 36 hours, such as about 24 h. Swollen clays were recovered e.g. by repetitive cycles of centrifugation and washing with deionized water. Filtration can also be used. The recovered solids were then dried, e.g. for a period of time ranging from about 6 to about 18 hours, such as about 12 h.

$SiO_2$ pillars were introduced into the swollen silicates (i.e. the silicates are impregnated with $SiO_2$) by, for example, mixing e.g. about of swollen silicate and tetraethyl orthosilicate at a 1:5 ratio (such as 1 g to 5 g) (tetraethyl orthosilicate is a liquid, swollen silicate is a solid powder) with stirring at about 80° C. (+/− about 5° C.) for a period of time ranging from about 12 to about 36 hours, such as about 24 h. The impregnated product was filtered and washed to remove excess silica from the solid surface, and then dried at e.g. 30° C. (+/− about 5° C.) for a period of time ranging from about 6 to about 18 hours, such as about 12 h. Following this, a dried impregnated solid was hydrolyzed with water (e.g. at a 1:10 ratio) or at 40° C. (+/− about 5° C.) for e.g. about 2.5 to 7 hours, such as about 5 hours. The hydrolyzed product is filtered and washed with deionized water, and the filtered cake is dried at 75° C. (+/− about 5° C.) for e.g. about 10 to 14 hours, such as about 12 h.

The dried product is calcined in a muffle furnace. Generally, calcining is performed: at a temperature ranging from about at 500 to about 700° C., such as about 600° C., with a heating rate of about 1.0° C. $min^{-1}$; for about 1-10 hours, such as about 5 h; under an air flow of about 120 mL $min^{-1}$.

To form catalytically active pillared layered silicates, transition metal (Cu, Fe and Mn, 15 wt. %) oxides are intercalated into the pillared, layered silicates. Typically, a predetermined amount corresponding to e.g. about 15 wt. % of metal oxide precursor [$Cu(NO_3)_2 \cdot 3H_2O$ or $Fe(NO_3)_3 \cdot 9H_2O$ or $Mn(NO_3)_2 \cdot 4H_2O$] is dissolved in deionized water, and about 85 wt. % of $SiO_2$ pillared layered silicate powder is added to the solution with constant stirring at room temperature. The products are dried in a vacuum oven to remove excess water and the dried products are then thermally treated at about 600° C. (+/− about 50° C.) for a period of time ranging from about 2 to about 6 hours, such as for 4 h.

The resulting dried powders are $SiO_2$ pillared magadiite or ilerite with Cu oxide, Fe oxide or Mn oxide intercalated therein.

Catalyst Compositions and Characteristics

The catalysts disclosed herein are of two types: $SiO_2$-pillared catalysts based on magadiite and $SiO_2$-pillared catalysts based on ilerite. Within the two types are three different subtypes, each of which comprises a different metal oxide: Cu, Fe or Mn. Hence, the catalysts disclosed herein are:

Cu—$SiO_2$ magadiite ("Cu—$SiO_2$-pil-mag"), Fe—$SiO_2$ magadiite ("Fe—$SiO_2$-pil-mag") and Mn—$SiO_2$ magadiite ("$SiO_2$-pil-mag"); and Cu—$SiO_2$ ilerite ("Cu—$SiO_2$-pil-ile"), Fe—$SiO_2$ ilerite ("Fe—$SiO_2$-pil-ile") and Mn—$SiO_2$ ilerite ("Mn—$SiO_2$-pil-ile").

The catalysts may be referred to herein, for example, as shown above in parentheses or by other equivalent names and abbreviations that are readily understandable to those of skill in the art.

Elemental analysis showed that for bulk analysis:

the amount of Si present in magadiite catalysts of all types was between 50 and 60 wt % (including all integers and decimal fractions in between to 0.1 decimal places); and for the ilerite catalysts of all types, the amount of Si was between 45 and 50 wt % (including all integers and decimal fractions in between to 0.1 decimal places);

the amount of O present in magadiite catalysts of all types was between 30 and 35 wt % (including all integers and decimal fractions in between to 0.1 decimal places), for example, about 33 wt %; and for the ilerite catalysts of all types, the amount of O was between 40 and 42% (including all integers and decimal fractions in between to 0.1 decimal places), for example, about 41 wt %;

and the amount of metal for all catalyst types was about 12.0 to 13.0 wt %. Elemental analysis showed that for surface analysis:

the amount of surface Si present in magadiite catalysts of all types was between 34 and 36 wt % (including all integers and decimal fractions in between to 0.1 decimal places), and was generally close to 35; and for the ilerite catalysts of all types, the amount of Si was between 42 and 45% (including all integers and decimal fractions in between to 0.1 decimal places);

the amount of surface O present in magadiite catalysts of all types was between 53 and 55 wt % (including all integers and decimal fractions in between to 0.1 decimal places), for example, about 54 wt %; and for the ilerite catalysts of all types, the amount of O was between 45 and 47% (including all integers and decimal fractions in between to 0.1 decimal places), for example, about 46 wt %;

and the amount of metal for all catalyst types was about 10 to 12 wt % and was generally near 10 or 11 wt %, including all integers and decimal fractions in between to 0.1 decimal places.

Incorporation of a metal oxide within an $SiO_2$ pillared clay generally decreases the available surface area of the clay, and this is the case for the present catalysts. For example, as measured herein, $SiO_2$-pil-mag has a surface area of nearly 500 $m^2/g^{-1}$ and incorporation of a metal oxide decreases the surface area to a range of from about 300 to about 400 $m^2/g^{-1}$. Generally, Mn results in the smallest decrease, followed by Cu and then Fe, which results in the largest decrease. Similarly, $SiO_2$-pil-ile has a surface area of nearly 600 $m^2/g^{-1}$ and incorporation of a metal oxide decreases the surface area to a range of from about 350 to about 500 $m^2/g^{-1}$. Again, Mn generally results in the smallest decrease, followed by Cu and then Fe, which results in the largest decrease. Pore volumes and pore widths follow the same trend, with magadiite catalysts having pore volumes ranging from about 0.275 to about 0.390 (cc g$^{-1}$); and pore widths ranging from about 2.0 to about 3.0 nm. Ilerite catalysts have pore volumes ranging from about 0.275 to about 0.390 (cc g$^{-1}$); and pore widths ranging from about 2.0 to about 3.5 nm. These units include all integers and decimal fractions in between to 0.1, 0.01 or 0.001 decimal places in accord with the original measurement.

For individual catalysts, the ranges are as follows:
Mn—SiO$_2$ magadiite: surface area (m$^2$/g$^{-1}$) from about 385 to 395, including all integers in between, inclusive; pore volume (cc g$^{-1}$) from about 0.385 to about 0.395, including all decimal fractions in between; and pore width (nm): from about 2.9 to about 2.5, such as about 2.9, 2.8, 2.7, 2.6 or 2.5.
Cu—SiO$_2$ magadiite: surface area (m$^2$/g$^{-1}$) from about 360 to 370, including all integers in between, inclusive; pore volume (cc g$^{-1}$) from about 0.315 to about 0.325, including all decimal fractions in between; and pore width (nm): from about 2.7 to about 2.3, such as about 2.7, 2.6, 2.5, 2.4 or 2.3.
Fe—SiO$_2$ magadiite: surface area (m$^2$/g$^{-1}$) from about 305 to 315, including all integers in between, inclusive; pore volume (cc g$^{-1}$) from about 0.280 to about 0.290, including all decimal fractions in between; and pore width (nm): from about 2.0 to about 2.4, such as about 2.0, 2.1, 2.2, 2.3 or 2.4.
Mn—SiO$_2$ ilerite: surface area (m$^2$/g$^{-1}$) from about 480 to 495, including all integers in between, inclusive; pore volume (cc g$^{-1}$) from about 0.475 to about 0.485, including all decimal fractions in between; and pore width (nm): from about 2.8 to about 3.2, such as about 2.8, 2.9, 3.0, 3.1 or 3.2.
Cu—SiO$_2$ ilerite: surface area (m$^2$/g$^{-1}$) from about 465 to 475, including all integers in between, inclusive; pore volume (cc g$^{-1}$) from about 0.410 to about 0.425, including all decimal fractions in between; and pore width (nm): from about 2.5 to about 2.9, such as about 2.5, 2.6, 2.7, 2.8 or 2.9.
Fe—SiO$_2$ ilerite: surface area (m$^2$/g$^{-1}$) from about 360 to 370, including all integers in between, inclusive; pore volume (cc g$^{-1}$) from about 0.375 to about 0.385, including all decimal fractions in between; and pore width (nm): from about 2.3 to about 2.7, such as about 2.3, 2.4, 2.5, 2.6 or 2.7.

The turnover frequencies (TOF, determined as moles of NO transformed to N$_2$ per mole of metal oxide per second) for the catalysts varied, with Cu containing catalyst generally exhibiting the highest TOFs at all temperatures tested, Mn containing catalysts generally exhibiting the lowest TOFs at all temperatures tested and Fe containing catalysts generally exhibiting intermediate TOFs at all temperatures tested. However, the TOFs for Mn and Fe were more similar to each other than to those of Cu.

The following units include all integers and decimal fractions in the range to 0.1 decimal places.

For Cu—SiO$_2$-pil-mag, the TOFs were e.g. about 16-17 at 400° C., about 21-23 at 450° C., 28-29° C. at 500° C., about 30-33 at 550° C. and about 33 to 35 at 600° C.

For Cu—SiO$_2$-pil-ile, the TOFs were e.g. about 20-22 at 400° C., about 29-30.5 at 450° C., about 38-41° C. at 500° C., about 48-50 at 550° C. and about 50-55 at 600° C.

For Fe—SiO$_2$-pil-mag, the TOFs were e.g. about 7-8 at 400° C., about 10-11 at 450° C., about 14.5-15.5° C. at 500° C., about 16.5-18 at 550° C. and about 17-20 at 600° C.

For Fe—SiO$_2$-pil-ile, the TOFs were e.g. about 9-10 at 400° C., about 12.5-14 at 450° C., about 16.5-18° C. at 500° C., about 19-21 at 550° C. and about 20-22 at 600° C.

For Mn—SiO$_2$-pil-mag, the TOFs were e.g. about 6-7 at 400° C., about 7.5-8.5 at 450° C., about 10-11.5° C. at 500° C., about 11-13 at 550° C. and about 13-15 at 600° C.

For Mn—SiO$_2$-pil-ile, the TOFs were e.g. about 7-8.5 at 400° C., about 10.5-11.5 at 450° C., about 12.5-14° C. at 500° C., about 14-16 at 550° C. and about 16.5 to 18 at 600° C.

The catalysts are highly durable. NO conversion and N$_2$ selectivity typically remain stable during continuous operation for at least about 48 hours or more, e.g. for 72, 96 or more hours.

The spent catalysts were also characterized to investigate the structural changes occurred during the reaction. The XRD and N$_2$ adsorption measurements of spent catalysts indicated that there are no significant changes in crystalline phases and porosity of the metal oxides intercalated SiO$_2$ pillared magadiite and ilerite samples; this observation indicating that the synthesized catalysts are robust.

Uses of the Catalysts

The presently disclosed catalysts are used for the direct decomposition of NO to N$_2$ and O$_2$. Generally, such reactions are carried out by contacting the NO with a catalyst (e.g. by causing the NO to flow over and/or through the pores and channels of the catalyst) so the NO comes into direct contact with as much of the catalytic surface as possible, e.g. with as much or as many of the metal oxides on the catalytic surface as possible. Generally, the catalytic reaction is carried out at a temperature or temperatures ranging from at least about 400° C. to 600° C., or higher. Preferably, the temperature is at least about 600° C. At these temperatures, the catalysts advantageously exhibit high selectivity for the conversion of NO to the innocuous gases N$_2$ and O$_2$.

The catalysts described herein can be used in any system or location where it is desired to directly decompose NO. Typically, for such systems, one or more catalysts as described herein are mounted (contained, supported) in a housing which permits gases comprising at least NO to enter the housing (via a means of ingress, an inlet, etc.), and flow, at an appropriate GHSV, over the working catalytic surfaces of the catalyst, i.e. into the pores and through pores and channels within the catalyst. GHSV is "gas hourly space velocity" and represents the ratio of gas flow rate in standard conditions to the volume of the bed of active phase catalyst.

Typically, catalytic direct NO decomposition reactions over synthesized catalysts were performed using a quartz micro reactor (id of 80 mm) at atmospheric pressure. Calculated amount (0.1 g) of sieved catalyst particles loaded into the quartz reactor. The reactor consisted of a quartz frit support and the catalyst particles (grain size of 60-80 μm, volume of the catalyst bed is 0.5 cm$^3$) was placed on the frit and covered with a layer of quartz wool and the catalyst was thermally treated at about 600° C. in a flow of helium gas before the start of the reaction. The catalytic performance was evaluated using 0.1 vol. % NO balanced by helium gas (total flow of the gas is about 200 mL min$^{-1}$) at temperature range of about 400-600° C.

Figure 10:
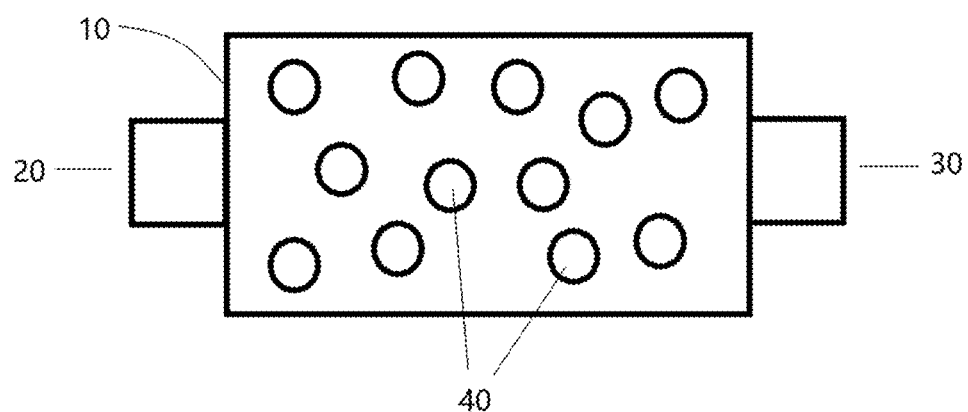
FIG. 10. Schematic representation of a catalyst in a housing for use in a system as described herein.

The housing also permits the gaseous products of catalysis, e.g. N$_2$, O$_2$, etc. to exit the housing (via a means of egress, an outlet, etc.). A schematic representation of the same is shown in FIG. 10, which depicts housing 10 with inlet 20 and outlet 30, and catalyst 40 contained therein. Exemplary systems in which the catalysts are used include but are not limited to:

After treatment/abatement for treating an exhaust stream of a combustion engine in a vehicle (cars, trucks, construction vehicles, tractors, etc.) such as those described in issued U.S. Pat. Nos. 10,526,947 and 9,464,547, and in published US patent applications 20210025311 and 20210016257, the complete contents of each of which is hereby incorporated by reference in entirety. In such systems, the present catalysts may be used in conjunction with, for example, one or more additional catalysts (e.g. a secondary catalyst), one or more gas sensors, pre- and post-heaters, and the like, to treat the exhaust streams of engines such as rich and especially lean burn engines, diesel engines, etc. For example, the catalyst may be used as part of an emissions control device in a catalyst and exhaust system such as those described in issued U.S. Pat. No. 9,636,634, the complete contents of which is hereby incorporated by reference in entirety. The catalyst(s) can be used in conjunction with other upstream and/or downstream elements of exhaust systems. For example, if $NO_2$, which is also a pollutant, is generated by the exhaust system or the catalyst, the $NO_2$ can be used to regenerate particulate matter (PM) that will be trapped e.g. by a downstream diesel particulate or soot filter.

The catalyst are used in filters for flue gas filtration systems (e.g. for manufacturing facilities, factories, processing plants, etc.). Examples of flue gas filtration are described in issued U.S. Pat. No. 10,940,471, the complete contents of which is hereby incorporated by reference in entirety. In such systems, the catalysts may be used in conjunction with various materials that absorb flue gases, one or more additional types of catalysts, etc.

In other aspects, the present catalysts could be also be used for selective catalytic reduction of $NO_x$ by $H_2$ or $NH_3$ or hydrocarbons or other exhaust gas components, including carbon monoxide and alcohols at low and high operating temperatures.

It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Representative illustrative methods and materials are herein described; methods and materials similar or equivalent to those described herein can also be used in the practice or testing of the present invention.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual dates of public availability and may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

EXAMPLES

1. As described in detail below, magadiite and ilerite were pillared with $SiO_2$ and then intercalated with Cu, Fe and Mn oxides to be utilized for direct NO decomposition between 400 and 600° C. Cu—$SiO_2$-pil-ile and Cu—$SiO_2$-pil-mag catalysts exhibited high NO decomposition activity compared to Fe and Mn oxide intercalated catalysts. Remarkably, Cu—$SiO_2$-pil-ile offered 90% NO conversion and 83% $N_2$ selectivity at 600° C. Elemental analysis, XRD, FESEM, DR UV-vis, $N_2$-adsorption, $H_2$-TPR, $O_2$-TPD and XPS were utilized to study physico-chemical characteristics of the materials. The results from XRD and $N_2$ adsorption demonstrated that the samples possessed different pore structures than $SiO_2$-pillared silicates, due to the different nature of the metal oxides. The Cu—$SiO_2$-pil-ile and Cu—$SiO_2$-pil-mag samples possess a lower number of Lewis and Brønsted acid sites compared with the Fe and Mn oxide intercalated samples. The presence of $Cu^{2+}/Cu^+$ and $Fe^{3+}/Fe^{2+}$, and synergism between redox centers is major reason for superior performance in NO decomposition. Therefore, the impact of redox properties and NO adsorption on the surface of the catalyst is significant.

2. Experimental 2.1 Synthesis of Magadiite

The synthesis procedure of Na-magadiite is described as reported in the literature [23]. The synthesis solution was prepared by mixing the Si and Na precursors containing a known amount of water (a weak alkaline and $SiO_2$-rich ternary system with $SiO_2$:$Na_2O$:$H_2O$ molar ratio of 5:1:75). Afterwards, $Na_2CO_3$ was added in small portions, until a dense gel was formed (pH~12.5). A hydrothermal method at 140° C. for 48 h was used to crystallize the Na-magadiite sample. Then the obtained solid sample was filtered and washed and dried at 110° C. for 12 h.

2.2 Synthesis of Ilerite

The preparation procedure to synthesize the sodium form of ilerite was similar to that described by Kärger at al [31].

Na-ilerite was synthesized using colloidal silica (Ludox® AS-40), sodium hydroxide pellets and deionized water as starting materials for the preparation of the synthesis gel. The obtained synthesis gel was directly transferred into the autoclave without aging. The synthesis temperature was set as 100° C. and the crystallization was carried out for 21 days under static conditions.

2.3 Post-Synthetic Modifications 2.3.1 Swelling of Silicates with Hexadecyltrimethylammonium Bromide (CTAB)

In the first step of post-modification, the layered silicates (magadiite and ilerite) were swollen with a quaternary ammonium surfactant, CTAB ($C_{19}H_{42}BrN$) at 40° C. under high pH conditions (pH~14). Typically, 9.0 g of aqueous clay slurry (20 wt. % solid) was added to 35.0 g of an aqueous solution of 29 wt. % of CTAB and 11.0 g of an aqueous solution of 40 wt. % tetrapropyl ammonium hydroxide (TPAOH). The mixture was then stirred for 24 h at 40° C.

2.3.2 Pillaring with $SiO_2$

After the swelling procedure, the materials were recovered by repetitive cycles of centrifugation and washing with deionized water, and then dried at 75° C. for 12 h. Typically, 1.0 g of swollen silicate was mixed with 5.0 g of tetraethyl orthosilicate and stirred at 80° C. for 24 h. Finally, the impregnated product was filtered and dried at 30° C. for 12 h to remove the excess silica from the solid surface. Then, a known amount (1.0 g) of dried impregnated solid was hydrolyzed with 10 g of water for at 40° C. for 5 hours. Then, the hydrolyzed product was filtered and washed with deionized water. Finally, the filtered cake was dried at 75° C. for 12 h and calcined at 600° C. for 5 h under air flow (120 mL min$^{-1}$) in a muffle furnace with a heating rate of 1.0° C. min$^{-1}$.

2.3.3 Intercalation of Pillared Silicates with Cu, Fe and Mn Oxides

To synthesize the catalytically active pillared layered silicates, transition metal (Cu, Fe and Mn, 15 wt. %) oxides were intercalated with the pillared layered silicates. Typically, a calculated amount of metal oxide precursor [Cu(NO$_3$)$_2$.3H$_2$O or Fe(NO$_3$)$_3$.9H$_2$O or Mn(NO$_3$)$_2$.4H$_2$O] was dissolved in deionized water and pillared layered silicate containing the same volume was added with constant stirring. Then, the excess water was removed in a vacuum oven and the dried powders were thermally treated at 600° C. for 4 h in the air under static conditions to obtain the final catalysts.

2.4 Characterization of Materials

The chemical compositions (atomic ratios of elements) of the samples were measured using a Perkin-Elmer ICP-AES instrument. The XRD patterns of the samples were recorded using Bruker D8 Advance X-ray diffractometer using Ni filtered Cu Kα radiation (λ=1.5405 Å). The FE-SEM analysis of the samples was carried out using JEOL Model JSM-6390LV microscope. The $N_2$ physisorption measurements were carried out using a Quantachrome Autosorb® ASiQ instrument at liquid nitrogen temperature. The DR UV-vis analysis of the samples was performing using a Thermo-Scientific evolution spectrophotometer in the wavelength range of 220-1000 nm. The XPS spectra of samples were obtained using a PHI Quantera Scanning XPS Microprobe operating in its large area mode. The $H_2$-TPR and $O_2$-TPD analyses of the synthesized samples were carried out using a Quantachrome CHEMBET-3000 instrument. The detailed experimental procedures are provided in a previous publication [32]. FT-IR spectra of pyridine adsorbed samples were obtained to determine the acidic properties of the synthesized samples.

2.5 Catalytic NO Decomposition

Catalytic direct NO decomposition reactions using the synthesized catalysts were performed using a quartz micro reactor at atmospheric pressure. Calculated amount (0.1 g) of sieved catalyst was loaded into the quartz reactor. The reactor consisted of a quartz frit support and the catalyst sample was placed on the frit and covered with a layer of quartz wool. The catalytic performance was evaluated using 0.1 vol. % NO balanced by helium gas at temperature range of 400-600° C. The NO concentration was continuously monitored by a chemiluminescent NO/NO$_x$ analyzer (Thermo Electron Corporation, model 10). A Shimadzu GC model 14A was used to analyze the concentrations of $N_2$ and $N_2O$ in the product stream. The analytical system had two capillary columns: a Poropak™-Q column used to analyze $N_2O$ and $CO_2$, and a molecular sieve SA used to analyze $N_2$, $O_2$, CO and NO. The NO conversion, $N_2$ yield and rate of $N_2$ formation was evaluated with every 50° C. increment. The reaction was carried out at each temperature for at least 30 mins to allow the reaction to reach equilibrium and conversion of NO remain constant until the measurements were taken. The NO conversion and $N_2$ yield were calculated using the following equations.

$$\text{NO conversion (\%)} = \{[NO]_{inlet} - [NO]_{outlet}/[NO]_{inlet}\}(100) \quad (1)$$

$$N_2 \text{ yield (\%)} = \{2[N_2]_{outlet}/[NO]_{inlet} - [NO]_{outlet}\}(100) \quad (2)$$

where $[NO]_{inlet}$=concentration of NO in the inlet, $[NO]_{outlet}$=concentration of NO in the outlet, $[N_2]_{outlet}$=concentration of $N_2$ in the outlet.

3. Results and Discussion

The powder X-ray diffraction patterns for as-synthesized Na-magadiite and Na-ilerite samples were obtained (not shown). The Na-magadiite sample displayed characteristic reflections of well-defined magadiite at 2θ=5.7°, 11.3°, and 17.11° corresponding to the (001), (002), and (003) crystalline planes, respectively as per JCPDS 42-1350 [33]. The reflections found between 23° and 30° reveal the presence of a magadiite phase in the sample. The 2θ positions for characteristic reflections for Na-ilerite structure were clearly observed at 8.0°, 18.6°, 21.8°, 25.6°, 29.2° in the X-ray pattern for the as-synthesized Na-ilerite sample and these findings are in excellent agreement with cited literature [31]. No additional reflections for any other phases were detected in the XRD patterns of Na-magadiite and Na-ilerite samples, indicating the effective synthesis of the layered silicates. Presence of (001) reflection corresponding to the basal spacing, $d_{(001)}$ after swelling and pillaring of layered silicates with CTAB and $SiO_2$ were clearly observed (not shown). The basal spacing corresponding to the $d_{(001)}$ reflection was calculated for both types of the samples and it was observed that the $SiO_2$ pillared magadiite and ilerite samples possessed basal spacing of 1.54 nm and 1.11 nm, respectively, and these values are in accordance with the previously reported results [34].

Figure 1B:
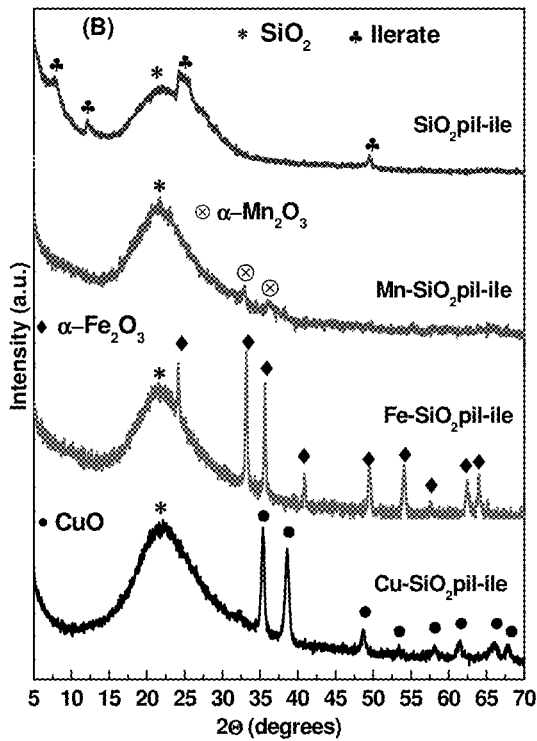

FIGS. 1 (A) & (B) shows the XRD patterns for the Cu, Fe and Mn oxides intercalated $SiO_2$-pillared magadiite (A), and ilerite (B) samples. These samples show dissimilar XRD patterns from Na-magadiite and Na-ilerite samples due to $SiO_2$ pillaring and intercalation of metal oxide between the layers of silicates. The XRD patterns of the samples clearly exhibit the presence of broad reflection in the range of 2θ=15-33°, which could be attributed to the amorphous $SiO_2$ as it forms as a pillar between the interlayers of silicates. The pillared structures are found to be created by the intercalation of $SiO_2$ between the silicate layers for each calcined product [35]. It has been reported that transition metal oxides could form due to the decomposition of metal hydroxide, when metal ions react with the —OH groups intercalated between the layers [36]. There is another clear possibility for the reaction between the $SiO_2$ and metal precursors to form amorphous metal silicates. The XRD patterns of Cu oxide intercalated magadiite and ilerite samples exhibited sharp reflections at 35.4°, 38.4° and 48.9° due to (110), (002) and (111) planes of the monoclinic phase of CuO (crystallite size of 20 nm) [JCPDS #45-0937]. Lim et al [37] observed the appearance of reflections due to a copper hydroxide phase in the case of Cu oxide intercalated magadiite samples. The Fe intercalated magadiite and ilerite samples also showed reflections due to the presence of a pure $\alpha$-$Fe_2O_3$ phase [JCPDS #24-0072] with rhombohedral structure. The presence of highly intense reflections due to CuO and $\alpha$-$Fe_2O_3$ phases is evidence for the formation of aggregated CuO and $\alpha$-$Fe_2O_3$ particles on the external surface of the $SiO_2$ pillared ilerite. Interestingly, the XRD patterns of Mn oxide intercalated magadiite and ilerite samples exhibit low intensity reflections at 32.95° and 38.23° corresponding to (222) and (440) planes of $\alpha$-$Mn_2O_3$ [JCPDS 41-1442]. The presence of low intensity reflections could be due to the fact that the formed $\alpha$-$Mn_2O_3$ is small in size, and bulk aggregation did not occurred.

In this study, Cu, Fe and Mn oxide intercalated $SiO_2$ pillared magadiite and ilerite samples were calcined at 550° C. and the samples still exhibited ordered basal spacing, proving that the expanded galleries did not collapsed after removal of CTAB. This observation revealed that the synthesis procedures used in this study are suitable for the formation of strong metal oxide pillars. It is well known that the $2\theta$ values of $d_{(001)}$ reflections reveal the extent of layer expansion due to metal oxide pillaring, and the expansion levels are differ according to the type of pillared oxide. The XRD analysis results also indicate that Cu, Fe and Mn oxide intercalated $SiO_2$ pillared magadiite and ilerite samples shows increases in the basal spacing. The values are higher (1-2 nm) compared to $SiO_2$ pillared magadiite and ilerite samples reported in the literature [35]. This behavior is probably due to the presence of large, hydrated Cu, Fe and Mn oxides, confirming the intercalation of the metal oxides between the silicate layers.

Figure 2:
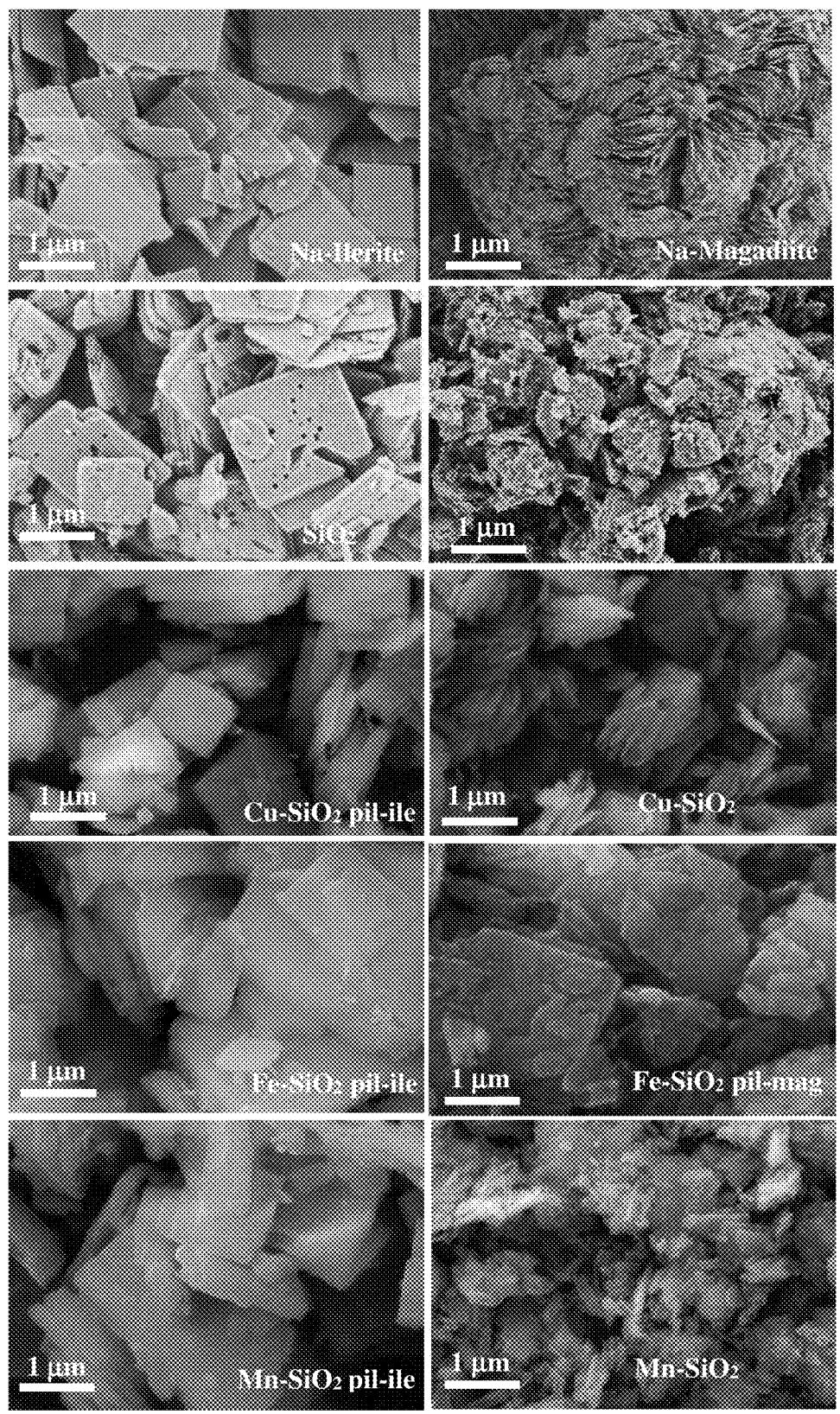
FIG. 2. FE-SEM images of Cu, Fe and Mn oxides intercalated $SiO_2$-pillared magadiite and ilerite samples.

FIG. 2 shows FE-SEM images for all the synthesized samples including Cu, Fe and Mn oxide intercalated $SiO_2$ pillared ilerite and magadiite samples. It was previously reported that natural magadiite sample possesses a thin sheet-like morphology; however, the synthetic magadiite samples normally exist in rosette-like shaped crystals [38]. Contrary to synthesized magadiite morphology, the synthetic ilerite crystals show a plate-like morphology [39]. It is clear from the SEM images that Na-magadiite and Na-ilerite samples exhibited morphologies as previously reported. It is clear that thin rectangular plate shaped Na-ilerite crystallites were preserved even after swelling with CTAB, $SiO_2$ pillaring and calcination at 600° C. The crystallites of the Cu, Fe and Mn intercalated $SiO_2$-pillared ilerite samples exhibited a similar morphology as that of Na-ilerite. Metal oxide modified $SiO_2$ pillared ilerite samples consisted of relatively large agglomerates of irregular and rectangular plate-shaped crystals typical for the ilerite phase. The typical ilerite thin plate shape structure is still preserved after metal oxide intercalation as shown in the SEM images. The $SiO_2$ pillared magadiite sample exhibited small, separated rosette-shaped islands with quite large interparticle spaces. The diameters for "flower" and "petals" were reduced to about 0.5-1.0 μm.

The observed suppression in particle size and creation of interparticle spaces could enhance the surface area and the mesoporous nature of pillared samples. The subsequent impregnation of Cu and Fe oxides over $SiO_2$ pillared magadiite led to a change of morphology to sheet-like crystals, with sharply defined edges [40]. Interestingly, the Mn modified $SiO_2$ pillared magadiite sample showed a morphology similar to the $SiO_2$ pillared magadiite sample. Only small amounts of rosette-shaped crystals, confirming the existence of the magadiite phase, were detected. This sample consisted of agglomerates of rosette-shaped crystals with amorphous material present on their surface, which correlates very well with the XRD results.

Figure 3A:
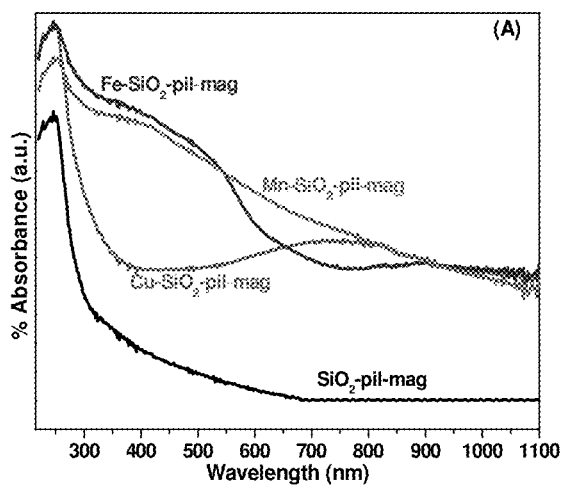
FIGS. 3A and B. DR UV-vis spectra of Cu, Fe and Mn oxides intercalated $SiO_2$-pillared (A) magadiite and (B) ilerite samples.
Figure 3B:
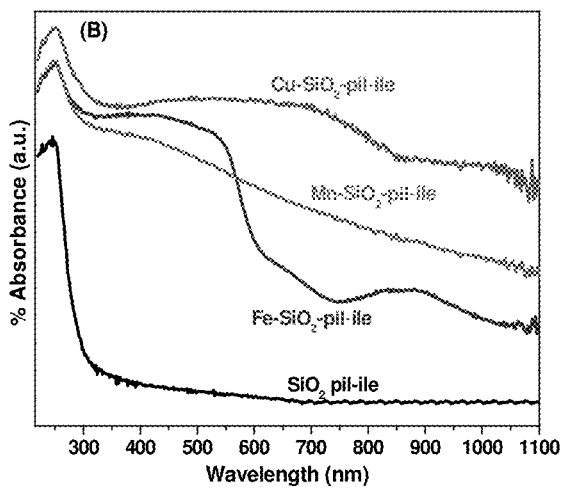
Figure 4J:
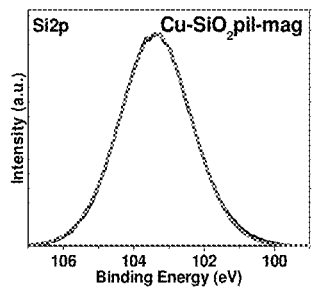
FIG. 4A-R. The deconvoluted XPS spectra of Cu, Fe and Mn oxides intercalated $SiO_2$-pillared ilerite and magadiite samples. A, Cu—$SiO_2$ ilerite Si2p; B, Cu—$SiO_2$ ilerite O1s; C, Cu—$SiO_2$ ilerite Cu2p; D, Fe—$SiO_2$ ilerite Si2p; E, Fe—$SiO_2$ ilerite O1s; F, Fe—$SiO_2$ ilerite Fe2p; G, Mn—$SiO_2$ ilerite Si2p; H, Mn—$SiO_2$ ilerite O1s; I, Mn—$SiO_2$ ilerite Mn2p; J, Cu—$SiO_2$ magadiite Si2p; K, Cu—$SiO_2$ magadiite O1s; L, Cu—$SiO_2$ magadiite Cu2p; M, Fe—$SiO_2$ magadiite Si2p; N, Fe—$SiO_2$ magadiite O1s; O, Fe—$SiO_2$ magadiite Fe2p; P, Mn—$SiO_2$ magadiite Si2p; Q, Mn—$SiO_2$ magadiite O1s; R, Mn—$SiO_2$ magadiite Mn2p.
Figure 4K:
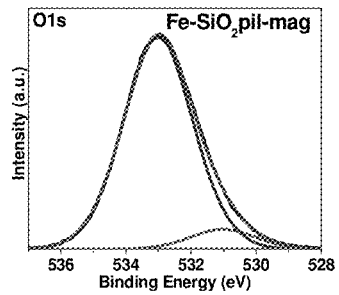
Figure 4L:
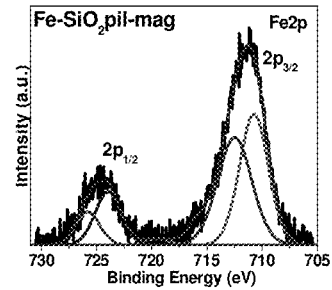
Figure 4M:
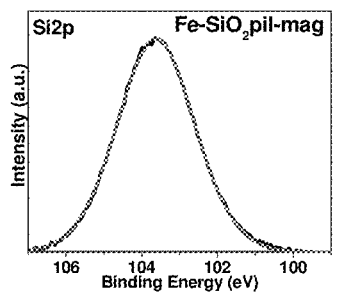
Figure 4N:
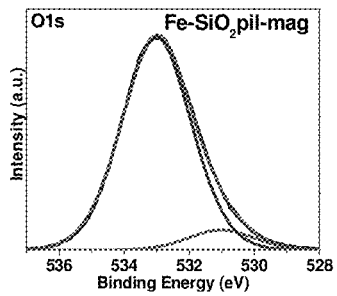
Figure 4O:
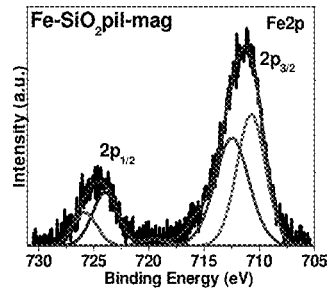
Figure 4P:
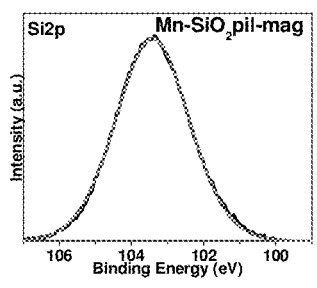
Figure 4Q:
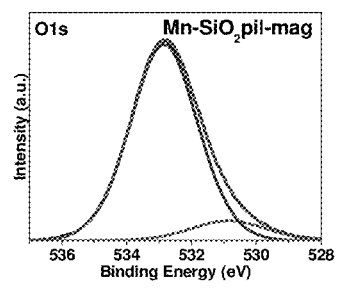
Figure 4R:
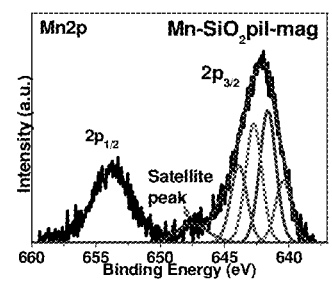

The DR UV-vis absorption spectra of synthesized samples are shown in FIG. 3. It is clear from the figure that all $SiO_2$ pillared magadiite and ilerite samples displayed an absorption band centered at 247 nm. Chen et al [41] reported that layered silicate samples exhibit a large absorption band in the range of 200-300 nm with a shoulder around 250 nm attributed to the wavelength region of silica. As anticipated, the metal oxide intercalated $SiO_2$ pillared magadiite and ilerite samples exhibited additional UV-vis absorption bands. The Cu—$SiO_2$-pillar-mag and Cu—$SiO_2$-pillar-ile samples show a broad band between 400 nm and 850 nm, which could be attributed to d-d transition of $Cu^{2+}$ species [42]. The appearance of a pronounced asymmetric peak shape suggests that the formed copper oxides have different size distributions of broad peaks which could be attributed to the presences of copper oxide nanoparticles [43].

The DR UV-vis spectra for Fe—$SiO_2$-pillar-mag and Fe—$SiO_2$-pillar-ile samples show absorption peaks due to the presence of different Fe (III) species. It is known that O—Fe charge transfer transitions generally appear at 240-300 nm and peaks in the region of 400-600 nm could be ascribed to the d-d electron pair transition in isolated Fe(III) species. The peaks appearing beyond 500 nm could be attributed to large iron oxide particles [44]. The Fe—$SiO_2$-pillar-mag and Fe—$SiO_2$-pillar-ile samples show broad absorption peaks in the range of 400-600 nm. It can be observed that the peak maximum for magadiite is at a wavelength of 460 nm. The center of the absorbance peaks for Fe—$SiO_2$-pillar-ile samples was at a wavelength around 520 nm. It was previously reported that the absorbance peak shifts towards a higher wavelength with an increase in particle size [45]. The peak identified around 900 nm in both the samples is due to the quantum size effect of $\alpha$-$Fe_2O_3$ nanoparticle structure [46] and the size of the iron oxide particles is more in the case of ilerite compared to magadiite. The DR UV-vis absorption spectra of Mn—$SiO_2$-pillar-mag and Mn—$SiO_2$-pillar-ile samples exhibited broad absorption peaks at 390 and 400 nm, respectively. It was previously reported that layer structured manganese oxide materials exhibit a UV-vis absorption peak centered on 380 nm [47]. The broad band at 400 nm with a tail extending to 900 nm in both the samples is possibly due to the presence of isolated Mn oxide clusters on the external surface of the layered silicates. A similar observation was previously reported in case of Mn exchanged zeolites [48].

XPS measurements were used to evaluate the elemental composition and oxidation states of metals presented in the synthesized catalysts. The deconvoluted XP spectra of the synthesized samples are shown in FIG. 4. It is clear from the figure that Si2p XPS peaks could be deconvoluted into two different peaks at binding energies (BE) of 103.3 eV and 102.2 eV in all the synthesized ilerite samples. It was previously reported that the Si2p peak at 103.3 eV could be attributed to Si in the tetrahedral sites of layered silicate [49] and this peak shifts to a lower BE value, when Si atoms are bonded with other metal atoms [50]. Therefore, the minor Si2p peak that appeared at 102.2 eV could be assigned to the Si—O-M (M=Cu, Fe and Mn) species presented in the metal intercalated $SiO_2$ pillared ilerite samples. In contrast, all the synthesized magadiite samples exhibited a single peak at BE of 103.3 eV corresponding to Si in the tetrahedral sites of layered silicate and the absence of Si2p peak at 102.2 eV in these samples revealed that the metal atoms are not in direct bonding with Si atoms of the magadiite structure.

Both Cu oxide intercalated $SiO_2$ pillared samples exhibited two Cu $2p_{3/2}$ peaks at 933.1 eV and 935.3 eV. Huang et al [51] assigned the peak at 933.1 eV to the $Cu^{2+}$ of CuO and the other peak at 935.3 eV to the copper phyllosilicate species. This observation reveals that Cu is chemically bonded with Si—O groups in both ilerite and magadiite samples to form an amorphous copper phyllosilicate phase on the surface. It is clear from the intensity of the peaks that the CuO contribution is more compared to the copper phyllosilicate, revealing the presence of more CuO particles on the surface of the layered silicates. The Fe oxide intercalated $SiO_2$ pillared ilerite sample exhibited two different Fe $2p_{3/2}$ peaks; a major peak at BE of 711.1 eV and a minor peak at 709.8 eV. Grosvenor et al [52] reported that fitting of Fe $2p_{3/2}$ peak for the $\alpha$-$Fe_2O_3$ phase yields peaks at 709.4 eV and 711.1 eV for $Fe^{2+}$ and $Fe^{3+}$ species, respectively. Therefore, presence of $\alpha$-$Fe_2O_3$ particles (majority $Fe^{3+}$) on the surface of ilerite is evidenced from XPS analysis. On the other hand, the Fe oxide intercalated $SiO_2$ pillared magadiite sample exhibited two equally intense peaks at 710.6 eV and 712.3 eV due to $Fe^{2+}$ and $Fe^{3+}$ species, respectively. The shift in the BE towards higher levels could be attributed to the decrease in the amount of $Fe^{3+}$ species in the $\alpha$-$Fe_2O_3$ particles. These observations are in agreement with the XRD results that this sample exhibited low intense XRD reflections due to $\alpha$-$Fe_2O_3$ phase.

The deconvoluted Mn2p peaks for the Mn oxide intercalated $SiO_2$ pillared samples also presented in the FIG. 4. As shown in the figure, Mn2p spectra of the samples were broadened by multiplet splitting, which is due to coupling between the excited unpaired 2p core-electron and unpaired 3d valence electrons. The deconvoluted Mn2p spectra also include shake-up satellite peaks. It was previously reported that the Mn $2p_{3/2}$ spectrum of Mn cations exhibits four major multiplet peaks separated by approximately 1.0 eV [53]. The XPS spectrum of the Mn oxide intercalated $SiO_2$ pillared ilerite sample also showed four Mn $2_{3/2}$ peaks at 640.5 eV, 641.9 eV, 643.2 eV and 644.8 eV, with a minor satellite peak. Similarly, Mn oxide intercalated $SiO_2$ pillared magadiite sample showed four peaks at 640.4 eV, 641.6 eV, 642.7 eV and 643.8 eV along with a major satellite peak. The average BE of the peaks is 642.1 eV and 642.6 eV for ilerite and magadiite samples and this observation indicates that both samples possessed $Mn^{3+}$ species [54]. In case of the Cu, Fe and Mn oxide intercalated $SiO_2$ pillared ilerite samples, the OIs spectra were deconvoluted into two components at 530.3 eV and 532.7 eV. The lower BE peak could be attributed to metal oxide species and the higher BE peak could be assigned to the $O_2^-$ species of the silicate layers [55]. The OIs spectra of the Cu, Fe and Mn oxide intercalated $SiO_2$ pillared magadiite samples also exhibited two peaks at 530.8 eV and 532.8 eV corresponding to oxygen species in metal oxide and silicate layers. The slight increase of BE in the magadiite samples is due to the small size particles present in these samples.

The bulk and surface elemental composition of the synthesized samples were obtained using ICP-AES and XPS techniques. The results are tabulated in Table 1.

TABLE 1

Elemental analysis of the synthesized samples

| | Elemental composition (wt. %) | | | | | | | |
|---|---|---|---|---|---|---|---|---|
| | Bulk | | | | Surface | | | |
| Catalyst | Na | Si | O | Metal | Na | Si | O | Metal |
| Na-mag | 4.2 | 43.5 | 52.2 | — | 3.9 | 43.3 | 52.5 | — |
| $SiO_2$-pil-mag | 1.1 | 57.4 | 41.4 | — | 0.6 | 41.3 | 58.1 | — |
| Mn-$SiO_2$-pil-mag | 0.2 | 54.6 | 33.0 | 12.2 | — | 35.4 | 54.1 | 10.4 |
| Cu-$SiO_2$-pil-mag | 0.1 | 54.0 | 33.5 | 12.4 | — | 34.9 | 53.8 | 11.3 |
| Fe-$SiO_2$-pil-mag | 0.1 | 54.1 | 33.4 | 12.3 | — | 34.8 | 54.3 | 10.8 |
| Na-ile | 6.7 | 32.8 | 60.3 | — | 6.5 | 32.7 | 60.2 | — |
| $SiO_2$-pil-ile | 1.3 | 48.2 | 50.4 | — | 0.7 | 48.0 | 50.3 | — |
| Mn-$SiO_2$-pil-ile | 0.1 | 46.3 | 41.5 | 12.1 | — | 42.4 | 46.2 | 11.4 |
| Cu-$SiO_2$-pil-ile | 0.1 | 46.0 | 41.3 | 12.6 | — | 43.5 | 46.0 | 10.5 |
| Fe-$SiO_2$-pil-ile | 0.1 | 45.8 | 41.1 | 12.9 | — | 44.1 | 45.5 | 10.4 |

As can be seen, the bulk composition of the sodium salts of ilerite ($Na_2Si_8O_{17}\cdot10H_2O$) and magadiite ($Na_2Si_{14}O_{29}\cdot83H_2O$) samples were matched well with the idealized formulas proposed in the literature [56]. The bulk chemical composition data obtained for the $SiO_2$ pillared and metal intercalated pillared ilerite and magadiite samples indicated that all these materials retain the structure of the starting parent material after the intercalation process, suggesting that the layered structures are preserved. A minor difference in the metal (Cu, Fe and Mn) concentrations in bulk (high) and surface (low) composition is observed; this is due to the presence of metal oxide particles inside the layers of ilerite and magadiite.

The nitrogen adsorption-desorption isotherms and pore size distribution patterns for Cu, Fe and Mn oxides intercalated $SiO_2$ pillared ilerite and magadiite samples were determined (not shown) and compared to the patterns for bulk $SiO_2$ pillared samples. The $N_2$ adsorption-desorption isotherms of the $SiO_2$-pillared magadiite and ilerite samples are analogous to a type IV isotherm, distinctive for the mesoporous materials, according to the Brunauer, Deming, Deming and Teller (BDDT) classification [57]. Also, for the ilerite and magadiite samples, the adsorption-desorption isotherms clearly confirm the lack of micropores and the presence of meso- and macropores. As synthesized ilerite and magadiite normally does not contain large pores, the observed large pores could be due to voids occurring between the crystals of the agglomerates. The hysteresis loop shown in the isotherms for the $SiO_2$ pillared materials is of Type H3 as per the IUPAC classification [58], which is characteristic for slit-shaped pores due to plate-like particles with voids among the particles [59]. The isotherms of metal intercalated $SiO_2$ pillared samples exhibited diminutive hysteresis loops and no steps at high relative pressures were observed. This is an indication that the metal oxide intercalated $SiO_2$ pillared silicates have few external surfaces between the particles. The pore size distribution patterns for all synthesized materials were obtained using NLDFT (not shown). Typical unimodal pore size distribution curves, in the mesoporous range (above 2 nm), were detected for the $SiO_2$ pillared samples. The Cu, Fe and Mn oxides intercalated $SiO_2$ pillared ilerite and magadiite samples exhibit slightly different pore size distributions compared to the parent materials due to the incorporation of a large amount of metal oxides resulted a broad range of pore size distributions, demonstrating the development of irregular pore structures. The pore volume and pore width were decreased with intercalation of metal oxides.

The BET surface areas observed for Na-ilerite and Na-magadiite are 26 and 21 $m^2 g^{-1}$ respectively, however after $SiO_2$ pillaring the surface area was increased drastically to 582 and 478 $m^2 g^{-1}$. This is due to pillar formation between silicate layers; similar observations were previously reported by other researchers [36]. As shown in the Table 2, intercalation of metals in the layered structure altered the porosity of the materials.

TABLE 2

BET surface area, pore volume and pore width of the synthesized samples

| Catalyst | Surface area ($m^2g^{-1}$) | Pore volume (cc $g^{-1}$) | Pore width (nm) |
| --- | --- | --- | --- |
| $SiO_2$-pil-mag | 478 | 0.426 | 2.8 |
| Mn-$SiO_2$-pil-mag | 392 | 0.389 | 2.7 |
| Cu-$SiO_2$-pil-mag | 364 | 0.321 | 2.5 |
| Fe-$SiO_2$-pil-mag | 308 | 0.285 | 2.2 |
| $SiO_2$-pil-ile | 582 | 0.521 | 3.2 |
| Mn-$SiO_2$-pil-ile | 488 | 0.482 | 3.0 |
| Cu-$SiO_2$-pil-ile | 469 | 0.418 | 2.7 |
| Fe-$SiO_2$-pil-ile | 364 | 0.382 | 2.5 |

As can be seen, the metal oxide intercalated $SiO_2$ pillared materials showed a decrease in the BET-surface area. In addition, the BET-surface area of Fe oxide intercalated samples is lower compared to Cu and Mn oxides intercalated samples. The formation of highly crystalline Fe and Cu oxide inside and outside of the silicate layers, as evidenced by XRD analysis, could be the reason for lower surface areas in the Fe and Cu oxide intercalated $SiO_2$ pillared materials. The decrease in porosity values reveals that the metal oxide particles might be located near to edge layers, resulting in blockage of interlayers [60].

Figure 5:
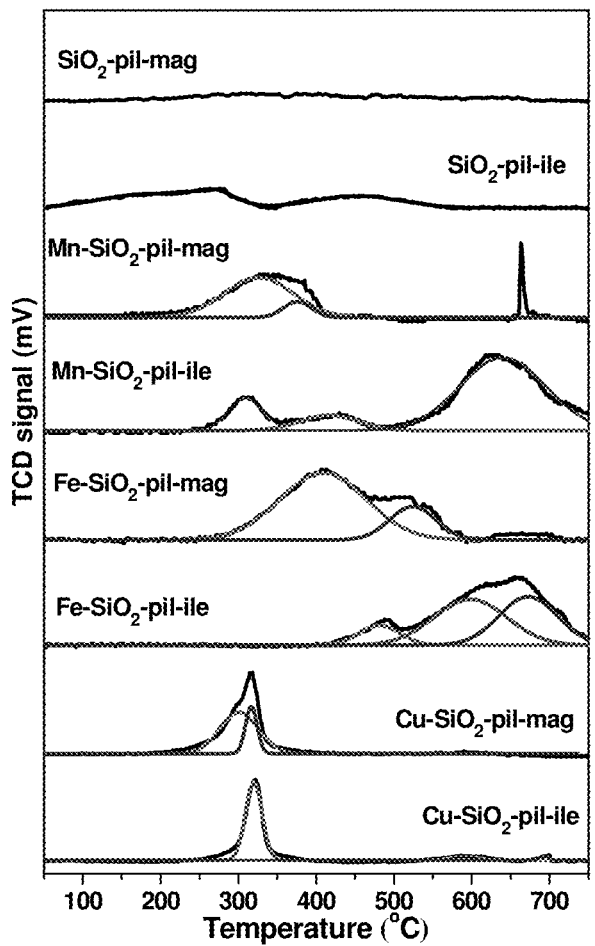
FIG. 5. H2-TPR patterns of Cu, Fe and Mn oxides intercalated $SiO_2$-pillared magadiite and ilerite samples.

$H_2$-temperature programed reduction ($H_2$-TPR) was used for the characterization of layered silicates comprising reducible metal oxides. The reduction of isolated metal oxides, in the layered silicate structure, usually proceeded at a lower temperature than that required for the reduction of bulk metal oxides or spinel structures formed due to calcination at higher temperatures [61]. The reduction profile of synthetic $SiO_2$ pillared magadiite (FIG. 5) displayed no reduction peaks, indicating that the cations present ($Na^+$ and $Si^{4+}$) could not be reduced under the experimental conditions selected (25-800° C.). On the other hand, $SiO_2$ pillared ilerite samples showed low intense noise peaks at around 300° C. and 450° C., which do not belong to any reducible species, but are probably due to complete thermal decomposition of residual CTAB remaining in the mesopores of ilerite samples. The Mn oxide intercalated $SiO_2$ pillared magadiite and ilerite samples showed two different reduction peaks in the low temperature region (250-450° C.) and one peak at the high temperature region (above 650° C.) with $H_2$ consumption of 1360 µmol/g and 1618 µmol/g, respectively. These reduction peaks could be associated with the reduction of Mn species via $MnO_2 \rightarrow Mn_3O_4 \rightarrow MnO$ [62].

The reduction profiles of Fe intercalated $SiO_2$ pillared magadiite and ilerite samples exhibited three different peaks. It was previously reported in the literature that Fe based catalysts could be reduced via three different steps [63]. The first one corresponds to reduction of $Fe_2O_3$ to $Fe_3O_4$ and FeO occurring between 250° C. and 450° C.; subsequently the second one is due to reduction of $Fe_3O_4$ and FeO to Fe above 500° C.; and third one could be attributed to Fe metal creation from the meta-stable FeO phase. It is clear that both the samples followed similar trends, as reported in the literature. The reduction peaks for Fe oxide intercalated ilerite samples appeared at higher temperatures compared to Fe intercalated magadiite samples; this is possibly due to a stronger interaction between the Si—O and $Fe^{3+}$ species in ilerite than in magadiite, as in later sample the presence of isolated bulk $Fe_2O_3$ particles was observed. The Cu intercalated magadiite and ilerite samples showed two reduction peaks in the temperature range of 250-350° C. It was previously reported that Cu—$SiO_2$ pillared layered silicate samples exhibited two reduction peaks; one at low-temperature and other at high-temperature corresponding to the presence of two different $Cu^{+2}$ species with slight differences in reducibility [64]. The low temperature reduction peak can be assigned to the reduction of isolated CuO species on the surface of silicate layers and the high temperature reduction peak can be attributed to the reduction of CuO interacted with Si—O moieties. The position and intensity of reduction peaks clearly revealed that the fraction of interacted CuO species is high in ilerite compared to magadiite.

Figure 6A:
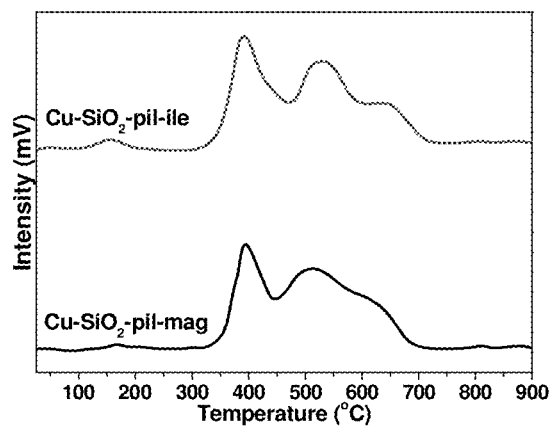
FIG. 6A-C. $O_2$-TPD patterns of (A) Cu, (B) Fe and (C) Mn oxides intercalated $SiO_2$ pillared magadiite and ilerite samples.
Figure 6B:
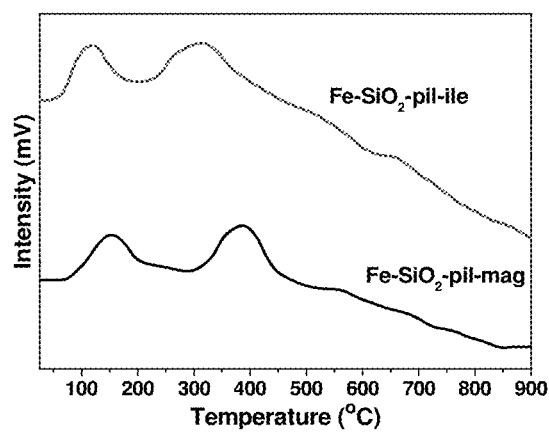
Figure 6C:
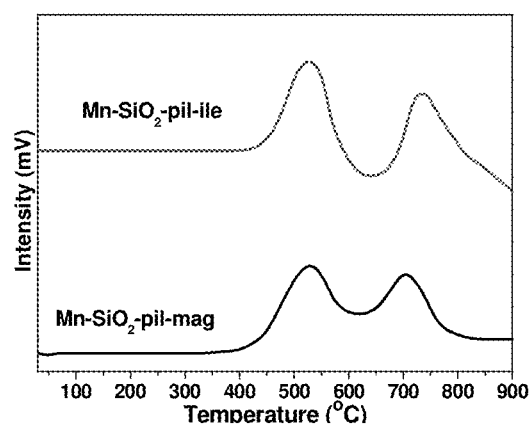

The $O_2$-TPD patterns of Cu, Fe and Mn oxide intercalated $SiO_2$ pillared magadiite and ilerite samples are presented in FIG. 6. It has been reported that oxygen desorption could occur in three stages. The first one at lower temperatures (<300° C.) could be due to surface $O_2$, $O_2^-$ and $O^-$ species. The second and third stage desorption peaks appear at relatively higher temperatures (>500° C.) and could be attributed to the release of lattice oxygen transport from the bulk of the metal oxide to the surface at high temperatures [65]. Both Mn intercalated catalysts exhibited major desorption peaks at high temperatures (greater than 500° C.), which is an indication that they have more lattice oxygen species. The slight difference in the peak maximum in the magadiite and ilerite could be due to the difference in particle size, which could retard the release of the bulk lattice oxygen.

It is clear from the figure that the Cu oxide intercalated samples exhibited a sharp major $O_2$ desorption peak around 400° C., and two broad desorption peaks at higher temperatures. The major desorption peak at low temperature indicates the high coverage of molecularly adsorbed $O_2$ or even the diffusion of $O_2$ molecules within the silicate layers. The presence of two high temperature $O_2$ desorption peaks suggests that two reduction mechanisms are responsible for the evolution of $O_2$, since we observed two high-temperature reduction processes in the two samples ($H_2$-TPR analysis). It is interesting to note that the Fe intercalated $SiO_2$ pillared ilerite sample's $O_2$-TPD patterns showed two major desorption peaks at low temperatures (155° C. and 350° C.) and a minor broad peak at 550° C. with a shoulder at 670° C. The Fe oxide intercalated $SiO_2$ pillared magadiite sample showed a very similar pattern, but the peaks were slightly shifted to higher temperatures. Metal oxides intercalated with $SiO_2$ pillared ilerite samples can desorb slightly more lattice oxygen than magadiite samples because their smaller particle size favors the migration of lattice oxygen. The $O_2$-TPD spectra of the synthesized samples suggests that Cu and Fe oxide intercalated samples possess a significant concentration of oxygen on the catalyst surface at lower temperatures (between of 350-450° C.). On the other hand, over the surface of Mn oxide intercalated samples, oxygen desorption starts at higher temperatures (above 400° C.). Moreover, the intensity and area under the sample desorption peaks clearly show that the Cu intercalated samples' oxygen adsorption capacity is higher compared to intercalated samples of Fe and Mn oxides.

For direct NO decomposition, the catalytic efficiency of synthesized Cu, Fe and Mn oxide intercalated $SiO_2$ pillared magadiite and ilerite catalysts were tested. Initially, a blank test was performed without any catalyst and a negligible NO conversion was observed at 400-600° C. temperature range under the tested reaction conditions. It is well known that NO usually decomposes into $N_2$ and $O_2$ in the direct NO decomposition process [3], but there is a strong possibility of forming unwanted $N_2O$ and $NO_2$ molecules as side products during the reaction. Different potential catalyst reactions are described below in equations 3, 4 and 5.

$$2NO \rightarrow N_2 + O_2 \quad (3)$$

$$NO \rightarrow 2N_2O + O_2 \quad (4)$$

$$NO + O_{lattice} \rightarrow NO_2 \quad (5)$$

The influence of reaction temperature in direct NO decomposition performance over Cu, Fe and Mn oxide intercalated $SiO_2$ pillared magadiite and ilerite catalysts studied. It was observed that parent $SiO_2$ pillared magadiite and ilerite samples exhibited low catalytic activity in the temperature range of 400-600° C. However, the intercalation of a transition metal (Cu Fe and Mn) oxide resulted in a significant improvement in catalytic activity for direct NO decomposition [FIG. 7 (A)]. A similar observation was reported for $CeO_2$ supported catalysts in that addition of first row transition metals to the $CeO_2$ support enhanced the direct NO decomposition activity [66]. As shown in the FIGS. 7 (A) & (B), with the increase of reaction temperature from 400° C. to 600° C., both the NO conversion and $N_2$ selectivity were increased in all transition metal oxide intercalated catalysts.

Among the synthesized samples, the Cu oxide intercalated magadiite and ilerite samples exhibited superior catalytic activity. Intercalation of Fe and Mn oxides to the $SiO_2$ pillared layered silicates have limited influence on the direct NO decomposition activity at all reaction temperatures. The Cu—$SiO_2$-pil-ile sample showed NO conversion of 34.4% at 400° C. and with increase of reaction temperature to 500° C. resulted increase of NO conversion to 73.8%. It is widely accepted that development of effective catalysts, which could offer high $N_2$ selectivity and NO conversion, is desirable [2]. Interestingly, the synthesized catalysts in this study have not yielded any $N_2O$ as a side product under the investigated reaction conditions; $N_2$ and $NO_2$ are the two products detected. It is clear from the stoichiometric reactions that $NO_2$ is the product which forms due to the oxidation of NO, while $N_2$ is the product due to the direct decomposition of NO.

Figure 7A:
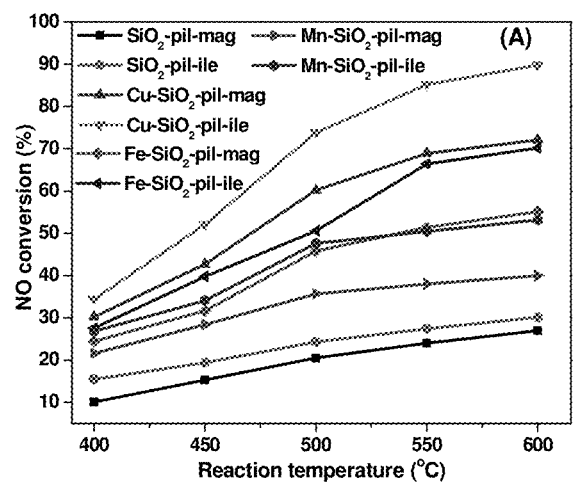
FIG. 7A-C. Influence of reaction temperature on (A) NO conversion (B) $N_2$ selectivity (C) $NO_2$ selectivity over synthesized catalysts.
Figure 7B:
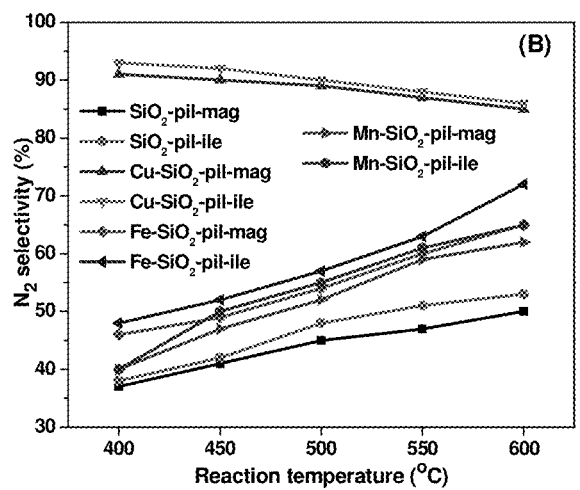
Figure 7C:
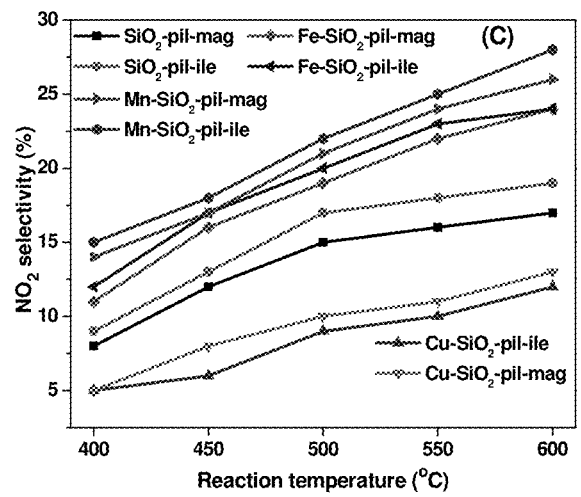

The $N_2$ and $NO_2$ selectivites of the Cu, Fe and Mn oxide intercalated $SiO_2$ pillared magadiite and ilerite samples at different reaction temperatures are shown in FIGS. 7 (B) & (C). The intercalation of Cu oxide led to a significant improvement in the $N_2$ selectivity, as both magadiite and ilerite samples exhibited around 90% selectivity toward $N_2$ at 400-500° C. and 85% selectivity to $N_2$ at 600° C. The intercalation of Fe and Mn oxides to the magadiite and ilerite also improved the $N_2$ selectivity; however these catalysts offered less $N_2$ selectivity compared to Cu oxide intercalated samples. Interestingly, in the case of Fe and Mn oxides intercalated samples, an increase of reaction temperature from 400 to 600° C. resulted in enhancement in selectivity to $N_2$ from 48% to 72% in the case of Fe-ilerite samples and 40% to 65% for Mn-ilerite samples. Intercalation of Cu leads to a high improvement in $N_2$ selectivity compared to Fe and Mn oxide intercalation at low reaction temperatures. The Mn oxide intercalated samples offered high selectivity to $NO_2$, probably due to the mobility of lattice oxygen and the ability of this catalyst to provide the oxygen species to NO molecules to form $NO_2$ is high.

Figure 8:
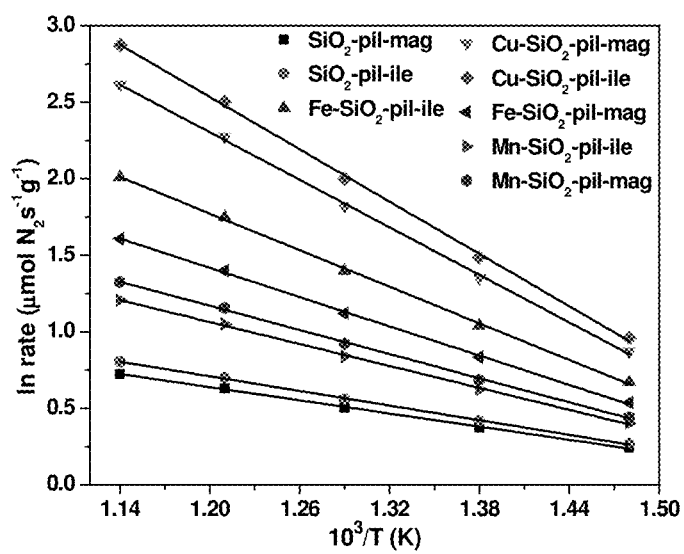
FIG. 8. The Arrhenius plots for NO decomposition for the synthesized catalysts.

The Arrhenius plots for NO decomposition for the synthesized catalysts in the temperature range of 400-600° C. are shown in FIG. 8. The apparent activation energy and reaction rate for NO decomposition over the most active catalyst, the Cu—$SiO_2$ pillar-ile sample, is calculated as 23.2 kcal mol$^{-1}$ and 2.6 μmol $N_2$ s$^{-1}$ g$^{-1}$ respectively at 500° C. It was previously reported that the most active Cu-ZSM-5 catalyst exhibited an activation energy of 22 kcal mol$^{-1}$ and reaction rate of 12 μmol $N_2$ s$^{-1}$ g$^{-1}$ [67]. For comparison purposes, bulk transition metal oxide (CuO, α-$Fe_2O_3$ and $Mn_2O_3$) samples were tested for direct NO decomposition and the samples exhibited very low NO conversion at 400 and 450° C. The NO conversion rates were increased then the reaction temperature was increased to 500 to 600° C. It is clear from activity data that the overall performance of bulk metal oxides is much lower when compared to metal oxide intercalated $SiO_2$-magadiite and ilerite samples (not shown). The investigated three bulk transition metal oxide samples exhibited lower NO conversions and $N_2$ selectivity compared to synthesized metal oxide intercalated $SiO_2$-magadiite and ilerite samples. These observations indicate that the higher direct NO decomposition of metal oxide intercalated layered silicate samples is not due to aggregated bulk metal oxide on the catalyst surface.

The turnover frequencies (TOF, determined as moles of NO transformed to $N_2$ per mole of metal oxide per second) for all the synthesized samples at different reaction temperatures was measured (Table 3).

TABLE 3

Dependence of TOF over synthesized catalysts at different temperatures (GHSV = 6000 h$^{-1}$)

| Sample | TOF (×10$^4$ s$^{-1}$) | | | | |
|---|---|---|---|---|---|
| | 400° C. | 450° C. | 500° C. | 550° C. | 600° C. |
| $SiO_2$-pil-mag | 2.1 | 2.5 | 2.8 | 3.0 | 3.1 |
| Cu-$SiO_2$-pil-mag | 16.5 | 21.8 | 28.5 | 31.8 | 33.9 |

TABLE 3-continued

Dependence of TOF over synthesized catalysts at different temperatures (GHSV = 6000 $h^{-1}$)

| Sample | TOF ($\times 10^4$ $s^{-1}$) | | | | |
|---|---|---|---|---|---|
| | 400° C. | 450° C. | 500° C. | 550° C. | 600° C. |
| Fe-SiO$_2$-pil-mag | 7.2 | 10.4 | 15.1 | 17.2 | 18.5 |
| Mn-SiO$_2$-pil-mag | 6.5 | 8.1 | 10.7 | 12.4 | 13.7 |
| SiO$_2$-pil-ile | 2.6 | 3.2 | 4.9 | 6.1 | 6.8 |
| Cu-SiO$_2$-pil-ile | 21.2 | 29.6 | 38.7 | 48.2 | 53.5 |
| Fe-SiO$_2$-pil-ile | 9.4 | 13.4 | 17.2 | 19.8 | 21.4 |
| Mn-SiO$_2$-pil-ile | 7.6 | 11.2 | 13.4 | 15.3 | 17.3 |

The data clearly indicated that the TOF was increased with increased reaction temperature for all synthesized samples and reached a maximum when the reaction temperature is 600° C. Cu oxide intercalated SiO$_2$ pillar-ilerite and magadiite samples showed the highest TOFs, as these samples showed the highest NO conversion to N$_2$ for NO decomposition.

In industrial catalyst development, the catalytic activity at high GHSV (gas hourly space velocity) is a crucial aspect. Therefore, the most active catalyst, Cu—SiO$_2$-pil-ile, was chosen to study the influence of GHSV on NO decomposition performance. The results are shown in Table 4.

TABLE 4

Influence of GHSVs NO conversion, selectivities to N$_2$ and NO$_2$ over Cu oxide intercalated SiO$_2$ pillared ilerate sample

| GHSV ($h^{-1}$) | NO conversion (%) | Selectivity to N$_2$ (%) | Selectivity to NO$_2$ (%) |
|---|---|---|---|
| 3000 | 75.2 | 88.2 | 11.0 |
| 6000 | 73.8 | 90.0 | 9.0 |
| 12000 | 61.5 | 92.1 | 8.2 |
| 18000 | 42.9 | 93.3 | 7.6 |
| 24000 | 35.2 | 94.1 | 7.1 |

As can be seen, with low GHSV, NO decomposition conversions appeared at a maximum; with a gradual increase of GHSV, NO conversion steadily decreased. With a further increase of GHSV to 18,000 $h^{-1}$, the selectivity to NO$_2$ has not changed significantly, whereas the selectivity of N$_2$ steadily decreased with the increase of GHSV. This observation reveals that NO conversion to N$_2$ and NO$_2$ is accomplished through separate rate-limiting steps.

Figure 9:
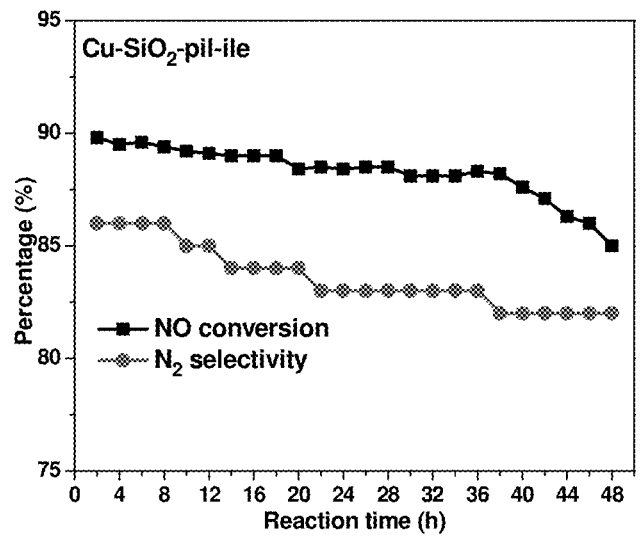
FIG. 9. The time on stream analysis of Cu—$SiO_2$-pil-ile catalyst.

The time on stream analysis (durability of catalyst) is also a significant aspect in catalyst development, and FIG. 9 demonstrates the results of time on stream analysis for a Cu—SiO$_2$-pil-ile sample. It can be seen that the NO conversion and N$_2$ selectivity were not altered significantly during the continuous operation of 48 h. The observed formation of NO$_2$ in the process could be due to the reaction between the undecomposed NO with lattice oxygen of the catalyst and this catalytic oxidation appeared be high in the case of Mn and Fe oxide intercalated SiO$_2$ pillared layered silicate samples. High NO conversion rates observed in Cu, Fe and Mn oxide intercalated layered silicate samples at higher reaction temperature could be attributed to high mobility of lattice oxygen, as O$_2$-TPD patterns of the samples exhibited major desorption peaks of lattice oxygen at high temperatures (500 to 700° C.). Overall, the formation of NO$_2$ observed with Cu—SiO$_2$-pil-ile is influenced by lowering the residence time at reaction temperatures lower than 600° C., compared to Fe and Mn oxide intercalated samples.

It was previously reported that low catalyst activity in the NO decomposition process could be due to a catalyst's inability to desorb oxygen formed from NO dissociation [68]. In the case of some catalysts, the oxygen formed due to NO dissociation is strongly bound to the surface of the catalyst, negatively influencing the active centers and hindering the progression of NO dissociation. The characterization data from XRD, XPS, H$_2$-TPR and O$_2$-TPD techniques for Cu, Fe, and Mn intercalated layered silicate samples is helpful to understand the structure and NO adsorption properties of the samples investigated in this study. Several decades ago, Iwamoto et al [69] reported that oxygen species adsorbed on Cu$^{2+}$ ions in the aluminosilicates can easily desorb at low temperatures (less than 300° C.), which is the contributing factor for superior activity of the Cu contained aluminosilicates catalysts for NO decomposition. The same research group indicated that a large quantity of Cu ions in aluminosilicates could be advantageous to enhance NO decomposition. Later, Yahiro et al [70] indicated that Cu$^+$ ions in aluminosilicates generated at high reaction temperatures were regarded as active centers and that NO decomposition progresses through the creation of NO$^{\delta-}$ or (NO)$_2^{\delta-}$ species on Cu$^+$ species. Groothaert et al [71] reported that the presence of O-bridged Cu planar complexes showed an influence on NO decomposition activity of Cu based catalysts, while Hayes et al [72] observed that CuO particles are the active catalytic species. Da Costa et al [73] provided evidence for the participation of the redox cycle of Cu—O—Cu species in NO decomposition activity. The authors also indicated that mobile oxygen atoms in the Cu—O—Cu species, but not the isolated Cu$^{2+}$ species, are required for rapid redox cycles for NO decomposition. Therefore, it is important to understand the nature of the Cu species in Cu—SiO$_2$-pil-ile and Cu—SiO$_2$-pil-mag responsible for their superior catalytic NO decomposition performance.

In the synthesized Cu oxide intercalated layered silicates, the majority of Cu is present in the form of CuO particles, as observed from XRD analysis. It was also observed that the average particle size of CuO was 20 nm, which is too big to move inside the pores of ilerite or magadiite. It is our interpretation that Cu$^{2+}$ ions in CuO particles are present at the interface of SiO$_2$ pillars of layered silicate surface, as the XPS results clearly indicated that Cu is chemically bonded with Si—O groups in both ilerite and magadiite samples to form an amorphous copper phyllosilicate on the surface. Gong et al [74] reported that copper phyllosilicates produce stable Cu$^+$ species on their surface, which are responsible for hydrogenation reaction. The H$_2$-TPR and O$_2$-TPD results indicated that the Cu—SiO$_2$-pil-ile and Cu—SiO$_2$-pil-mag catalysts possessed easily reducible Cu species and the mobility of oxygen atoms is also high. Both of these are directly related to superior NO decomposition activity. Thus, the excellent NO decomposition activity of Cu—SiO$_2$-pil-ile and Cu—SiO$_2$-pil-mag samples could be ascribed to both the existence of Cu$^{2+}$ and Cu$^+$ species and also to oxygen desorption from Cu species at moderate temperatures. In addition, it is well known that NO is an acidic molecule and NO adsorption greatly depends on the surface acid/base character of the catalyst. The FT-IR spectra of the pyridine adsorbed catalysts (not shown) showed that the Cu—SiO$_2$-pil-ile and Cu—SiO$_2$-pil-mag samples possess a lower number of Lewis and Brønsted acid sites, compared with Fe and Mn oxide intercalated samples. This factor also affects the reactivity of NO with surfaces of Cu—SiO$_2$-pil-ile and Cu—SiO$_2$-pil-mag catalysts.

4. Conclusions

In this work, layered silicates (magadiite and ilerite) were pillared with $SiO_2$ and then intercalated with Cu, Fe and Mn oxides and the synthesized materials were utilized as catalysts for direct NO decomposition in the temperature region of 400-600° C. The catalytic activity results indicated that among the synthesized samples, Cu intercalated $SiO_2$ pillared magadiite and ilerite samples are efficient catalysts (90% NO conversion and 83% selectivity to $N_2$ at 600° C.). Elemental analysis, XRD, FE-SEM, DR UV-vis, $N_2$-adsorption, $H_2$-TPR, $O_2$-TPD and XPS measurements were used to study the physico-chemical properties of the synthesized metal oxide intercalated layered silicate materials. The results from XRD and $N_2$ adsorption-desorption measurements demonstrated that Cu, Fe and Mn oxide-$SiO_2$ pillared silicate samples possessed different pore structures then $SiO_2$-pillared silicates, due to the different nature of metal oxides. The Cu—$SiO_2$-pil-ile and Cu—$SiO_2$-pil-mag samples possesses fewer Lewis and Brønsted acid sites compared to Fe and Mn oxide intercalated samples. The XPS analysis of the samples revealed that intercalation of both Cu and Fe resulted in the presence of $Cu^{2+}/Cu^+$ and $Fe^{3+}/Fe^{2+}$, and the synergism between the redox centers is the major reason for superior performance in NO decomposition. Conversely, Mn remained in the single oxidation state ($Mn^{3+}$) in the Mn intercalated catalysts. The $H_2$-TPR and $O_2$-TPD results indicated that the Cu—$SiO_2$-pil-ile and Cu—$SiO_2$-pil-mag catalysts possessed easily reducible Cu species and mobility of the oxygen atoms is also high, which attributes are directly related to the superior NO decomposition activity. Thus, the activity of Cu—$SiO_2$-pil-ile and Cu—$SiO_2$-pil-mag samples can be accredited to both the existence of $Cu^{2+}$ and $Cu^+$ species and also to oxygen desorption from Cu species at moderate temperatures.

ACKNOWLEDGEMENTS

This project was funded by the Deanship of Scientific Research (DSR) at King Abdulaziz University, Jeddah, under grant no. G-197-130-1440. The authors, therefore, acknowledge with thanks DSR for technical and financial support.

REFERENCES

[1] N. Imanaka, T. Masui, Appl. Catal. A: Gen. 431-432 (2012) 1-8. https://doi.org/10.1016/j.apcata.2012.02.047.

[2] M. Haneda, H. Hamada, Comptes Rendus Chimie 19 (2016) 1254-1265. http://doi.org/10.1016/j.crci.2015.07.016.

[3] F. Garin, Appl. Catal. A: Gen. 222 (2001) 183-219. https://doi.org/10.1016/S0926-860X(01)00827-4.

[4] S. Royer, D. Duprez, F. Can, X. Courtois, C. B. Dupeyrat, S. Laassiri, H. Alamdari, Chem. Rev. 114(2014) 10292-10368. https://doi.org/10.1021/cr500032a.

[5] J. Zhu, D. Xiao, J. Li, X. Yang, Y. Wu, J. Mol. Catal. A, 234 (2005) 99-105. https://doi.org/10.1016/j.molcata.2005.02.015.

[6] H. Iwakuni, Y. Shinmyou, H. Yano, H. Matsumoto, T. Ishihara, Appl. Catal. B, 74 (2007) 299-306. https://doi.org/10.1016/j.apcatb.2007.02.020.

[7] N. Imanaka, T. Masui, H. Masaki, Adv. Mater. 19 (2007) 3660-3663. https://doi.org/10.1002/adma.200602323.

[8] WJ. Hong, S. Iwamoto, M. Inoue, Catal. Today 164 (2011) 489-494. https://doi.org/10.1016/j.cattod.2010.10.063.

[9] Y. Teraoka, K. Torigoshi, H. Yamaguchi, T. Ikeda, S. Kagawa, J. Mol. Catal. A 155 (2000) 73-80. https://doi.org/10.1016/S1381-1169(99)00320-9.

[10] S. Matsumoto, Catal. Today, 90 (2004) 183-190. https://doi.org/10.1016/j.cattod.2004.04.048.

[11] K. Pacultová, V. Draštíková, . Chromčáková, T. Bílková, K. M. Kutláková, A. Kotarba, L. Obalová, Mol. Catal. 428 (2017) 33-40. https://doi.org/10.1016/j.molcata.2016.11.038.

[12] D. K. Lee, Korean J. Chem. Eng. 21 (2004) 611-620. https://doi.org/10.1007/BF02705495.

[13] M. Y. Kustova, S. B. Rasmussen, A. L. Kustov, C. H. Christensen, Appl. Catal. B: Environ. 67 (2006) 60-67. https://doi.org/10.1016/j.apcatb.2006.04.014.

[14] T. Ennaert, J. Van Aelst, J. Dijkmans, R. De Clercq, W. Schutyser, M. Dusselier, D. Verboekend, B. F. Sels, Chem. Soc. Rev. 45 (2016) 584-611. https://doi.org/10.1039/C5CS00859J.

[15] S. J. Kim, K.-D. Jung, O.-S. Joo, E. J. Kim, T. B. Kang, Appl. Catal. A: Gen. 266 (2004) 173-180. https://doi.org/10.1016/j.apcata.2004.02.003.

[16] J. Herney-Ramírez, L. M. Madeira, in: A. Gil, S. A. Korili, R. Trujillano, M. A. Vicente (Eds.), Pillared Clays and Related Catalysts, Springer-Verlag New York, USA, 2010, pp 129-165. https://doi.org/10.1007/978-1-4419-6670-4_6.

[17] J. Baloyi, T. Ntho, J. Moma, RSC Adv. 8 (2018) 5197-5211. https://doi.org/10.1039/C7RA12924F.

[18] W. Supronowicz, F. Roessner, W. Schwieger, M. Meilikhov, D. Esken, Clays Clay Miner. 60 (2012) 254-264. https://doi.org/10.1346/CCMN.2012.0600303.

[19] M. E. Landis, B. A. Aufdembrink, P. Chu, I. D. Johnson, G. W. Kirker, M. K. Rubin, J. Am. Chem. Soc. 113 (1991) 3189-3190. https://doi.org/10.1021/ja00008a067.

[20] K. Kosuge, A. Tsunashima, Chem. Commun. (1995) 2427-2428. https://doi.org/10.1039/C39950002427.

[21] W. Schwieger, O. Gravenhorst, T. Selvam, F. Roessner, R. Schloegl, D. Su, G. T. P. Mabande, Colloid Polym. Sci. 281 (2003) 584-588. https://doi.org/10.1007/s00396-002-0835-4.

[22] A. Kuhlmann, F. Roessner, W. Schwieger, O. Gravenhorst, T. Selvam, Catal. Today 97, 2004, 303-306. https://doi.org/10.1016/j.cattod.2004.07.014.

[23] W. Schwieger, T. Selvam, O. Gravenhorst, N. Pfaender, R. Schloegl, G. T. P. Mabande, J. Phys. Chem. Solids. 65 (2004) 413-420. https://doi.org/10.1016/j.jpcs.2003.08.032.

[24] S. J. Kim, E. J. Kim, T. B. Kang, K.-D. Jung, O.-S. Joo, C.-H. Shin, J. Porous Mater. 13 (2006) 27-35. https://doi.org/10.1007/sl0934-006-5487-1.

[25] S.-F. Wang, M.-L. Lin, Y.-N. Shieh, Y.-R. Wang, S.-J. Wang, Ceram. Int. 33 (2007) 681-685. https://doi.org/10.1016/j.ceramint.2005.12.005.

[26] S.-H. Ahn, S.-H. Kim, H.-S. Hahm, Res. Chem. Intermed. 34 (2008) 793-801. https://doi.org/10.1007/BF03036940.

[27] K. Ozawa, Y. Nakao, Z. Cheng, D. Wang, M. Osada, R. Okada, Mater. Lett. 63 (2009) 366-369. https://doi.org/10.1016/j.matlet.2008.10.038.

[28] A, Gil, M. A. Vicente, S. A. Korili (2006) Catal Today 112 (2006) 117-120. https://doi.org/10.1016/j.cattod.2005.11.046.

[29] Z. Ding, J. T. Kloprogge, R. L. Frost, J. Porous Mater. 8 ((2001) 273-293. https://doi.org/10.1023/A:1013113030912.

[30] A. Święs, A. Kowalczyk, M. Rutkowska, U. Díaz, A. E. Palomares, L. Chmielarz, Catalysts 10(7) (2020)734. https://doi.org/10.3390/catal10070734.

[31] U. Brenn, H. Ernst, D. Freude, R. Herrmann, R. Jähnig, H. G. Karge, J. Kärger, T. König, B. Mädler, U.-T. Pingel, D. Prochnow, W. Schwieger, Microporous Mesoporous Mater. 40 (2000) 43-52. https://doi.org/10.1016/S1387-1811(00)00241-9.

[32] K. Narasimharao, A. Alshehri, Fuel 278 (2020) 118375. https://doi.org/10.1016/j.fuel.2020.118375.

[33] G. L. Paz, E. C. O. Munsignatti, H. O. Pastore, J. Mol. Catal. A Chem. 422 (2016) 43-50. https://doi.org/10.1016/j.molcata.2016.02.014.

[34] A. O. Moura, A. G. S. Prado, J. Colloid Interface Sci. 330 (2009) 392-398. https://doi.org/10.1016/j.jcis.2008.10.032.

[35] K. Kosuge, P. S. Singh, Chem. Mater. 12 (2000) 421-427. https://doi.org/10.1021/cm990451m.

[36] S. Vortmann, J. Rius, S. Siegmann, H. Gies, J. Phys. Chem. B 101 (1997) 1292-1297. https://doi.org/10.1021/jp962162g.

[37] W. Lim, J.-H. Jang, N.-Y. Park, S.-M. Paek, W.-C. Kim, M. Park, J. Mater. Chem. A 5 (2017) 4144-4149. https://doi.org/10.1039/C7TA00038C.

[38] D. Sebag, E. P. Verrecchia, S.-J. Lee, A. Durand, Sediment. Geol. 139 (2001) 15-31. https://doi.org/10.1016/S0037-0738(00)00152-4.

[39] T. Iwasaki, T. Kuroda, S. Ichio, M. Satoh, Chem. Eng. Comm. 193 (2006) 69-76. https://doi.org/10.1080/009864490923529.

[40] Q. Wang, Y. Zhang, T. Hu, X. Jing, C. Meng, Microporous Mesoporous Mater. 246 (2017) 102-113. https://doi.org/10.1016/j.micromeso.2017.03.024.

[41] Y. Chen, G. Yu, F. Li, J. Wei, Appl. Clay Sci. 88 (2014) 163-169. https://doi.org/10.1016/j.clay.2013.12.014.

[42] I. R. Iznaga, V. Petranovskii, G. R. Fuentes, C. Mendoza, A. B. Aguilar, J. Colloid Interface Sci. 316 (2) (2007) 877-886. https://doi.org/10.1016/j.jcis.2007.06.021.

[43] K. Wang, L. Yang, W. Zhao, L. Cao, Z. Sun, F. Zhang, Green Chem. 19 (2017) 1949-1957. https://doi.org/10.1039/C7GC00219J.

[44] Y. Liu, C. Dong, H. Wei, W. Yuan, K. Li, Appl. Clay Sci. 118 (2015) 301-307. https://doi.org/10.1016/j.clay.2015.10.010.

[45] S. A. Kulkami, P. S. Sawadh, P. K. Palei, J. Korean Chem. Soc. 58 (2014) 100-104. https://doi.org/10.5012/jkcs.2014.58.1.100.

[46] C. Hui, C. Shen, J. Tian, L. Bao, H. Ding, C. Li, Y. Tian, X. Shi, H.-J. Gao, Nanoscale 3 (2011) 701-705. https://doi.org/10.1039/C0NR00497A.

[47] Y. Omomo, T. Sasaki, L. Wang, M. Watanabe, J. Am. Chem. Soc. 125 (2003) 3568-3575. https://doi.org/10.1021/ja021364p.

[48] D. Radu, P. Glatzel, A. Gloter, O. Stephan, B. M. Weckhuysen, F. M. F. de Groot, J. Phys. Chem. C 112 (2008) 12409-12416. https://doi.org/10.1021/jp802915k.

[49] J. J. Chambers, G. N. Parsons, J. Appl. Phys. 90 (2001) 918-933. https://doi.org/10.1063/L1375018.

[50] M. J. Guittet, J. P. Crocombette, M. Gautier-Soyer, Phys. Rev. B 63 (2001) 125117. https://doi.org/10.1103/PhysRevB.63.125117.

[51] X. M. Huang, M. Ma, S. Miao, Y. P. Zheng, M. S. Chen, W. J. Shen, Appl. Catal. A Gen. 531 (2017) 79-88. https://doi.org/10.1016/j.apcata.2016.12.006.

[52] A. P. Grosvenor, B. A. Kobe, M. C. Biesinger, N. S. McIntyre, Surf. Interface Anal. 36 (2004) 1564-1574. https://doi.org/10.1002/sia.1984.

[53] A. K. Shukla, P. Kruger, R. S. Dhaka, D. I. Sayago, K. Horn, S. R. Barman, Phys. Rev. B 75 (2007) 235419. https://doi.org/10.1103/PhysRevB.75.235419.

[54] H. W. Nesbitt, S. B. Banerjee, Am. Mineral. 83 (1998) 305-315. https://doi.org/10.2138/am-1998-3-414.

[55] Y. Du, M.-S. Zhang, J. Hong, Y. Shen, Q. Chen and Z. Yin, Appl. Phys. A 76 (2003) 171-176. https://doi.org/10.1007/s003390201404

[56] Z. Wang, T. J. Pinnavaia, J. Mater. Chem. 13 (2003) 2127-2131. https://doi.org/10.1039/B306167A.

[57] J. P. Nguetnkam, R. Kamga, F. Villieras, G. E. Ekodeck, A. Razafitianamaharavo, J. Yvon, J. Colloid Interf. Sci. 289 (2005) 104-115. https://doi.org/10.1016/j.jcis.2005.03.053.

[58] K. S. W. Sing, Pure Appl. Chem. 54 (1982) 2201-2218. http://dx.doi.org/10.1351/pac198254112201.

[59] O. Barth, J. Kornatorski, J. A. Lercher, J. Mater. Chem. 12 (2002) 369-373. https://doi.org/10.1039/B104824B.

[60] D. Dutta, B. J. Borah, L. Saikia, M. G. Pathak, P. Sengupta, D. K. Dutta, Appl. Clay Sci. 2053 (2011) 650-656. https://doi.org/10.1016/j.clay.2011.05.018.

[61] V. Rives, M. A. Ulibarri, A. Montero, Appl. Clay Sci. 10 (1995) 83-93. https://doi.org/10.1016/0169-1317(95)00009-S.

[62] O. Ostrovski, N. Anacleto, S. Ganguly, (2004). Reduction of manganese ores by methane containing gas, Proceedings Tenth International Ferroalloys Congress, 173-183. ISBN: 0-259584663-5-1.

[63] K. Keyvanloo, B. Huang, T. Okeson, H. H. Hamdeh, W. C. Hecker, Catalysts 8 (2018) 77. https://doi.org/10.3390/catal8020077.

[64] L. Lin, P. B. Pan, Z. F. Zhou, Chin. J. Catal. 32 (2011) 957-968. https://doi.org/10.1016/S1872-2067(10)60223-9.

[65] Y. G. Zhang, Z. F. Qin, G. F. Wang, H. Q. Zhu, M. Dong, S. N. Li, Z. W. Wu, Z. K. Li, Z. H. Wu, J. Zhang, T. D. Hu, W. B. Fan, J. G. Wang, Appl. Catal. B: Environ. 129 (2013) 172-181. https://doi.org/10.1016/j.apcatb.2012.09.021.

[66] G. K. Reddy, T. C. Peck, C. A. Roberts, J. Phys. Chem. C 123 (47) (2019) 28695-28706. https://doi.org/10.1021/acs.jpcc.9b07736.

[67] Y. Li, W. K. Hall, J. Catal. 129 (1991) 202-215. https://doi.org/10.1016/0021-9517(91)90024-X.

[68] K. Almusaiteer, R. Krishnamurthy, S. S. C. Chuang, Catal. Today 55 (2000) 291-299. https://doi.org/10.1016/S0920-5861(99)00242-4.

[69] M. Iwamoto, S. Yokoo, K. Sasaki, S. Kagawa J. Chem. Soc. Faraday Trans. 1, 77 (1981) 1629-1638. https://doi.org/10.1039/F19817701629.

[70] H. Yahiro, M. Iwamoto, Appl. Catal. A 222 (2001) 163-181. https://doi.org/10.1016/S0926-860X(01)00823-7.

[71] M. H. Groothaert, J. A. van Bokhoven, A. A. Battiston, B. M. Weckhuysen, R. A. Schoonheydt, J. Am. Chem. Soc. 125 (2003) 7629-7640. https://doi.org/10.1021/ja029684w.

[72] N. W. Hayes, R. W. Joyner, E. S. Shpiro, Appl. Catal. B: Environ. 8, (1996) 343-363, doi.org/10.1016/0926-3373(95)00074-7.

[73] P. Da Costa, B. Moden, G. D. Meitzner, D. Ki Leeza, E. Iglesia, Phys. Chem. Chem. Phys. 4 (2002) 4590-4601. https://doi.org/10.1039/B203700A.

[74] J. Gong H. Yue, Y. Zhao, S. Zhao, L. Zhao, J. Lv, S. Wang, X. Ma, J. Am. Chem. Soc. 134 (2012) 13922-13925. https://doi.org/10.1021/ja3034153.

While the invention has been described in terms of its several exemplary embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

We claim:

1. A catalyst for direct decomposition of NO to $N_2$ and $O_2$, comprising
    $SiO_2$ pillared magadiite comprising Cu oxide, Fe oxide or Mn oxide intercalated therein, wherein the catalyst comprising the $SiO_2$ pillared magadiite has a catalytic surface area from 300 to 400 $m^2/g^{-1}$ and a pore volume from 0.275 to 0.390 (cc g-1); or
    $SiO_2$ pillared ilerite comprising Cu oxide, Fe oxide or Mn oxide intercalated therein, wherein the catalyst comprising the $SiO_2$ pillared ilerite has a catalytic surface area from 350 to 500 $m^2/g^{-1}$ and a pore volume from 0.275 to 0.390 (cc g-1).

2. The catalyst of claim 1, wherein the catalyst is configured as a bulk catalyst, wherein the bulk catalyst comprises either
    the $SiO_2$ pillared magadiite, wherein the $SiO_2$ pillared magadiite comprises 50-60 wt % Si, 30-35 wt % O, and/or 12-13 wt % metals; or
    the $SiO_2$ pillared ilerite, wherein the $SiO_2$ pillared ilerite comprises 45-50 wt % Si, 40-42 wt % O and/or 12-13 wt % metals.

3. The catalyst of claim 1, wherein the catalyst has a catalytic surface, wherein the catalytic surface comprises either
    the $SiO_2$ pillared magadiite, wherein the catalytic surface comprises 34-36 wt % Si, 53-55 wt % O and 10-12 wt % metals; or
    the $SiO_2$ pillared ilerite, wherein the catalytic surface comprises 42-45 wt % Si, 45-47 wt % O and 10-12 wt % metals.

4. The catalyst of claim 1, wherein
    the $SiO_2$ pillared magadiite has a pore width from 2.0 to 3.0 nm; or
    the $SiO_2$ pillared ilerite has a pore width from 2.0 to 3.5 nm.

5. The catalyst of claim 1, wherein
    for Cu—$SiO_2$-pil-mag, the turnover frequency (TOF) is 16-17 at 400° C., 21-23 at 450° C., 28-29° C. at 500° C., 30-33 at 550° C. and 33 to 35 at 600° C.;
    for Cu—$SiO_2$-pil-ile, the TOF is 20-22 at 400° C., 29-30.5 at 450° C., 38-41 at 500° C., 48-50 at 550° C. and 50-55 at 600° C.;
    for Fe—$SiO_2$-pil-mag, the TOF is 7-8 at 400° C., 10-11 at 450° C., 14.5-15.5° C. at 500° C., 16.5-18 at 550° C. and 17-20 at 600° C.;
    for Fe—$SiO_2$-pil-ile, the TOF is 9-10 at 400° C., 12.5-14 at 450° C., 16.5-18° C. at 500° C., 19-21 at 550° C. and 20-22 at 600° C.;
    for Mn—$SiO_2$-pil-mag, the TOF is 6-7 at 400° C., 7.5-8.5 at 450° C., 10-11.5° C. at 500° C., 11-13 at 550° C. and 13-15 at 600° C.; or
    for Mn—$SiO2$-pil-ile, the TOF is 7-8.5 at 400° C., 10.5-11.5 at 450° C., 12.5-14° C. at 500° C., 14-16 at 550° C. and 16.5 to 18 at 600° C.

6. A method of direct decomposition of NO to $N_2$ and $O_2$, comprising
    contacting the NO with a catalyst of claim 1, wherein the step of contacting results in direct decomposition of NO to $N_2$ and $O_2$.

7. The method of claim 6, wherein the step of contacting is performed in the temperature range of 400-600° C.

8. The method of claim 6, wherein the catalyst is $SiO_2$ pillared magadiite comprising Cu oxide intercalated therein or $SiO_2$ pillared ilerite comprising Cu oxide intercalated therein.

9. The method of claim 6, wherein the activation energy for the direct decomposition of NO is at most 20 kcal $mol^{-1}$ at 500° C.

10. The method of claim 6, wherein the reaction rate for the direct decomposition of NO is at least 2.5 µmol $N_2$ $s^{-1}$ $g^{-1}$ at 500° C.

11. The method of claim 6, wherein the step of contacting results in 90% NO direct decomposition of NO at 600° C.

12. The method of claim 6, wherein the method is at least 80% selective for the direct decomposition of NO at 600° C.

* * * * *